US012748663B2

(12) United States Patent
Sinha et al.

(10) Patent No.: US 12,748,663 B2
(45) Date of Patent: Sep. 29, 2026

(54) METHODS AND APPARATUSES FOR FAULT RECOVERY OF VIDEO DATA

(71) Applicant: Verkada Inc., San Mateo, CA (US)

(72) Inventors: Vikas Kumar Sinha, Sunnyvale, CA (US); Sandeep Gautham Mattur Mahabala, Santa Clara, CA (US); Alan Anderson, Mountain View, CA (US); Patrick Matthew Grady, San Francisco, CA (US)

(73) Assignee: Verkada Inc., San Mateo, CA (US)

( * ) Notice: Subject to any disclaimer, the term of this patent is extended or adjusted under 35 U.S.C. 154(b) by 100 days.

(21) Appl. No.: 18/757,017

(22) Filed: Jun. 27, 2024

(65) Prior Publication Data

US 2025/0086057 A1 Mar. 13, 2025

Related U.S. Application Data

(63) Continuation of application No. 18/464,709, filed on Sep. 11, 2023, now Pat. No. 12,038,810.

(51) Int. Cl.
*G06F 11/00* (2006.01)
*G06F 11/07* (2006.01)
*G06F 11/10* (2006.01)

(52) U.S. Cl.
CPC ........ *G06F 11/108* (2013.01); *G06F 11/0706* (2013.01)

(58) Field of Classification Search
CPC ............... G06F 11/108; G06F 11/0706; G06F 11/0727; G06F 11/0733; G06F 11/0736; G06F 11/1076
See application file for complete search history.

(56) References Cited

U.S. PATENT DOCUMENTS

| | | | | |
|---|---|---|---|---|
| 5,832,198 | A | 11/1998 | Lucht | |
| 6,519,772 | B1 | 2/2003 | Bopardikar | |
| 6,832,198 | B1 | 12/2004 | Nguyen et al. | |
| 11,741,804 | B1 | 8/2023 | Saxena et al. | |
| 2017/0033806 | A1* | 2/2017 | Arslan | G06F 3/0616 |
| 2017/0322844 | A1* | 11/2017 | Hong | G11B 20/1833 |
| 2022/0066877 | A1* | 3/2022 | Danilov | G06F 11/1076 |
| 2022/0417473 | A1* | 12/2022 | Davidson | H04N 7/56 |

OTHER PUBLICATIONS

Author Unknown, "Erasure Coding Scheme for Data Protection and Recovery," retrieved from the internet at https://docs.ezmeral.hpe.com/datafabric-customer-managed/70/StorageTiers/SelectECScheme.html on Jan. 5, 2024, 5 pages.

(Continued)

*Primary Examiner* — Joseph D Manoskey
(74) *Attorney, Agent, or Firm* — COOLEY LLP

(57) ABSTRACT

First video data captured by a first camera from a set of cameras is received and caused to be stored in a first data stripe from a set of data stripes. Second video data captured by the first camera is received and caused to be stored in a second data stripe from the set of data stripes. An indication is received that the first video data has become inaccessible. Data associated with the first data stripe is received from a subset of cameras from the set of cameras that excludes the first camera. The first video data is generated based on the data received from the subset of cameras.

20 Claims, 13 Drawing Sheets

(56) References Cited

OTHER PUBLICATIONS

Author Unknown, "Github repo for Jerasure Library—C Implementation of Reed-Solomon coding," tsuraan / Jerasure, GitHub, Inc. 3 pages [online], Jan. 18, 2015 [retrieved on Jan. 5, 2024]. Retrieved from the Internet: URL: https://github.com/tsuraan/Jerasure.
Beach, "Backblaze Open-sources Reed-Solomon Erasure Coding Source Code," Jun. 16, 2015, retrieved from the internet at https://www.backblaze.com/blog/reed-solomon/, on Jan. 5, 2024, 19 pages.
Khemani, "Erasure Coding for the Masses More Math, Less Money to Keep Your Data Safe," Dec. 21, 2020, retrieved from the internet at https://towardsdatascience.com/erasure-coding-for-the-masses-2c23c74bf87e, 29 pages.
Liang et al., "An Erasure-Coded Storage System for Edge Computing," IEEE Access, May 20, 2020, retrieved from intent at https://ieeexplore.ieee.org/stamp/stamp.jsp?arnumber=9097196 on Jan. 5, 2024, 13 pages.
Mu et al., "When Paxos Meets Erasure Code: Reduce Network and Storage Cost in State Machine Replication," retrieved from internet at https://madsys.cs.tsinghua.edu.cn/publications/HPDC2014-mu.pdf on Jan. 5, 2024, 12 pages.
Non-Final Office Action for U.S. Appl. No. 18/464,709 dated Nov. 15, 2023, 16 pages.
Notice of Allowance for U.S. Appl. No. 18/464,709 dated Mar. 5, 2024, 5 pages.
Plank et al., "Jerasure—A C/C++ Library for a Variety of Reed-Solomon and RAID-6 Erasure Coding Techniques," Jerasure/Examples/reed_sol_01.c; tsuraan / Jerasure, GitHub, Inc. 5 pages [online], 2014 [retrieved on Jan. 5, 2024]. Retrieved from the Internet: URL: https://github.com/tsuraan/Jerasure/blob/master/Examples/reed_sol_01.c.
Plank, "Tutorial on Erasure Coding for Storage Applications, Part 1," Feb. 12, 2013, retrieved from internet at https://web.eecs.utk.edu/~jplank/plank/papers/2013-02-11-FAST-Tutorial.pdf on Jan. 5, 2024, 107 pages.
Wang et al., "CRaft: An Erasure-coding-supported Version of Raft for Reducing Storage Cost and Network Cost," Proceedings of the 18th USENIX Conference on File and Storage Technologies (FAST '20), Feb. 25-27, 2020, 13 pages.
Wikipedia, "Paxos (computer science)," retrieved from the internet at https://en.wikipedia.org/wiki/Paxos_(computer_science) on Jan. 5, 2024, 22 pages.
Wikipedia, "Raft (algorithm)," retrieved from internet at https://en.wikipedia.org/wiki/Raft_(algorithm), on Jan. 5, 2024, 5 pages.

* cited by examiner

500

METHODS AND APPARATUSES FOR FAULT RECOVERY OF VIDEO DATA

CROSS REFERENCE TO RELATED APPLICATIONS

This application is a Continuation of U.S. patent application Ser. No. 18/464,709, filed Sep. 11, 2023 and titled "Methods and Apparatuses for Fault Recovery of Video Data," the disclosure of which is hereby incorporated by reference in its entirety.

FIELD

One or more embodiments are related to methods and apparatuses for fault recovery of video data.

BACKGROUND

Video captured by a camera can become inaccessible. For example, the memory storing the video may stop working and/or no longer be retrievable (e.g., stolen, lost, etc.). As another example, the camera itself may stop working in a manner that renders the data stored therein no longer retrievable. Some known data recovery techniques implement erasure coding as a form of data protection. These known techniques store data and parity information as part of stripes that can be used to recover otherwise inaccessible data; if data from a stripe becomes inaccessible, other data and parity information part of the same stripe can be used to recover the lost data. These known techniques, however, do not solve the problem of placing the parity information such that data and parity information are not on the same device for any given stripe. Stated another way, known systems have at least one device, for each stripe, that stores both the data and parity information. If that at least one device (or the memory of that at least one device) becomes inaccessible, the data and parity information stored at the at least one device also become inaccessible. Consequently, other data in the same stripe becomes unrecoverable since the now inaccessible data and parity information cannot be retrieved.

SUMMARY

In an embodiment, first video data captured by a first camera from a plurality of cameras is received. The first video data is caused to be stored in a first data storage medium operatively coupled to the first camera as part of a first data stripe from a plurality of data stripes that is associated with the plurality of cameras. Parity data associated with the first video data is caused to be stored in a second data storage medium operatively coupled to a second camera from the plurality of cameras as part of the first data stripe without storing the parity data in the first data storage medium. The second camera is different from the first camera and the second data storage medium is different from the first data storage medium. A detection is made, at the first camera and in response to a request that references the first video data and that includes a representation of the parity data, that the first video data has become inaccessible via the first data storage medium. The first video data is caused to be retrieved from the first data stripe based on the parity data.

In an embodiment, first sensor data captured by a first sensor from a plurality of sensors is received. Parity data associated with sensor data captured by a second sensor from the plurality of sensors different than the first sensor is caused to be stored at a data storage medium operatively coupled to the first sensor as part of a first data stripe from a plurality of data stripes associated with the plurality of sensors. The sensor data does not include the first sensor data but includes second sensor data as captured by the second sensor. The first sensor data is caused to be stored in the data storage medium as part of a second data stripe from the plurality of data stripes. The second data stripe is different from the first data stripe. An indication that the second sensor data has become inaccessible to the second sensor is received at a first time. In response to receiving the indication that the second sensor data has become inaccessible, the parity data is sent to the second sensor to cause the second sensor to retrieve the second sensor data at a second time after the first time based at least on the parity data.

In an embodiment, first video data captured by a first camera from a plurality of cameras is received. The first video data is caused to be stored in a first data stripe from a plurality of data stripes. Second video data captured by the first camera is received. The second video data is caused to be stored in a second data stripe from the plurality of data stripes. A size of the second video data and a size of the first video data are substantially the same. An indication is received that the first video data has become inaccessible. Data associated with the first data stripe is received from each camera from the plurality of cameras except the first camera. The first video data is generated based on the received data.

DETAILED DESCRIPTION

Some implementations of the present disclosure are related to implementing distributed erasure coding functionality in a fleet of multiple sensors (e.g., cameras) for improving their reliability and robustness to failures (e.g., memory failures), relative to known techniques. In contrast with known techniques, and in accordance with some embodiments, sensor data and parity information stored at other sensors in the fleet (i.e., excluding a failed sensor) can be used to retrieve—regardless of the specific sensor that failed—sensor data that was stored in the failed sensor.

Sensor data and parity information can be stored in multiple stripes, where (1) each stripe is associated with sensor data and parity information, (2) the sensor data and parity information are stored at sensors of the fleet, and (3) the sensor storing the parity information for a given stripe does not also store sensor data captured by that sensor in the same stripe (rather, that sensor data is stored at a different stripe). If sensor data becomes inaccessible (e.g., deleted, memory malfunction, sensor malfunction, etc.), the other sensor data and parity information associated with the same stripe can be used to retrieve the inaccessible/lost sensor data. Using techniques described here, sensor data can be retrieved no matter which sensor becomes inaccessible.

Figure 1:
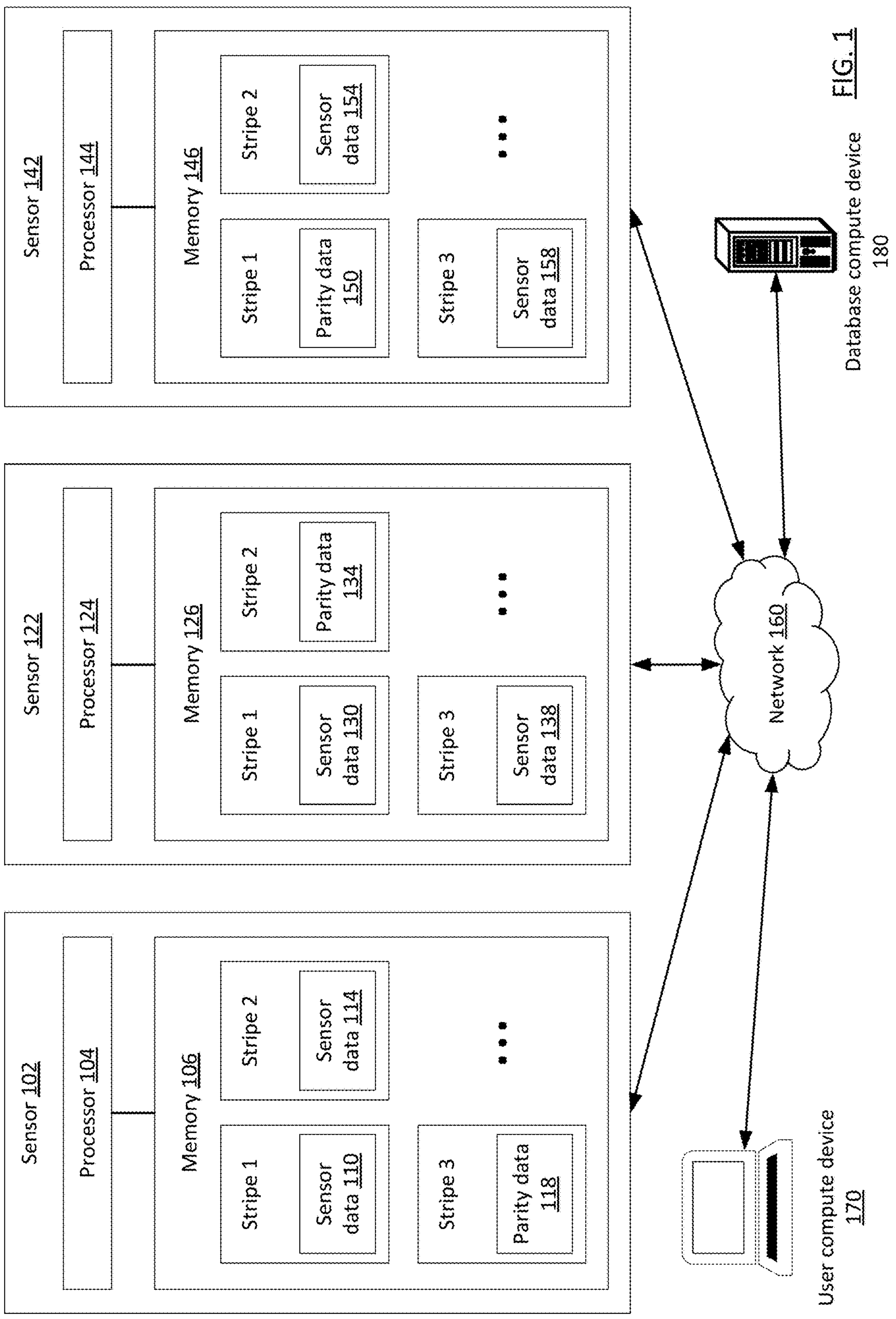
FIG. 1 is a block diagram of a system for retrieving lost data captured by a sensor using parity data, according to an embodiment.

FIG. 1 is a block diagram of a system for retrieving lost data captured by a sensor using parity data, according to an embodiment. FIG. 1 includes sensor 102, sensor 122, sensor 142, user compute device 170, and database compute device 180, each communicably coupled to one another via network 160. In some implementations, each of sensors 102, 122, and 142 are separately housed and/or geographically remote from one another. In other words, in such implementations, sensor 102 is not co-located with either of sensors 122 and 142, and sensor 122 is not co-located with sensor 142. In other implementations, two of sensors 102, 122, and 142 are co-located/commonly housed (i.e., disposed within the same housing) and the remaining sensor is geographically remote from the two co-located sensors.

Network 160 can be any suitable communications network for transferring data, for example operating over public and/or private communications networks. For example, network 160 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 160 can be a wireless network such as, for example, a Wi-Fi® or wireless local area network ("WLAN"), a wireless wide area network ("WWAN"), and/or a cellular network. In other instances, the network 160 can be a wired network such as, for example, an Ethernet network, a digital subscription line ("DSL") network, a broadband network, and/or a fiber-optic network. In some instances, network 160 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via network 160 can be encrypted or unencrypted. In some instances, the network 160 can include multiple networks or subnetworks operatively coupled to one another by, for example, network bridges, routers, switches, gateways and/or the like.

Sensor 102 includes processor 104 and memory 106, communicably coupled to one another (e.g., via a system bus). Memory 106 can be a data storage medium operatively coupled to processor 104. Sensor 122 includes processor 124 and memory 126, communicably coupled to one another (e.g., via a system bus). Memory 126 can be a data storage medium operatively coupled to processor 124. Sensor 142 includes processor 144 and memory 146, communicably coupled to one another (e.g., via a system bus). Memory 146 can be a data storage medium operatively coupled to processor 144.

Each of sensors 102, 122, and 142 can be any type of sensor, such as a camera, an image sensor, a photodetector, an air quality monitoring sensor, a smoke and/or vapor detection sensor, a temperature and/or humidity monitoring sensor, a noise level monitoring sensor, and/or the like. If sensor 102 is a camera, the camera can capture video and/or images, and can be any type of camera (e.g., dome camera, bullet camera, fisheye camera, internet protocol (IP) camera, 4K camera, pan-tilt-zoom (PTZ) camera, WiFi camera, license plate recognition (LPR) camera, and/or the like).

Each of processors 104, 124, 144 can be or include, for example, a hardware-based integrated circuit (IC) or any other suitable processing device configured to run and/or execute a set of instructions or code. For example, processors 104, 124, 144 can be or include a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processors 104, 124, 144 can be configured to execute/run any of the methods and/or portions of methods discussed herein.

Each of memories 106, 126, 146 can be or include, for example, a random-access memory (RAM), a memory buffer, a hard drive, a read-only memory (ROM), an erasable programmable read-only memory (EPROM), and/or the like. Memories 106, 126, 146 can be configured to store any data used by processors 104, 124, 144 (respectively) to perform the techniques (methods, processes, etc.) discussed herein. For example, memories 106, 126, 146 can include secure digital (SD) cards (e.g., to store images and/or video captured by sensors 102, 122, 142). In some instances, memories 106, 126, 146 can store, for example, one or more software programs and/or code that can include instructions to cause the processors 104, 124, 144 (respectively) to perform one or more processes, functions, and/or the like. In some implementations, memories 106, 126, 146 can include extendible storage units that can be added and used incrementally. In some implementations, memories 106, 126, 146 can be portable memories (for example, a flash drive, a portable hard disk, a SD card, and/or the like) that can be operatively coupled to the processor 141. In some instances, memories 106, 126, 146 can be remotely operatively coupled with a compute device (not shown in FIG. 1).

Sensor 102 can capture sensor data over a period of time. Once sensor 102 has captured sensor data having a predetermined/predefined size (e.g., 1 MB, 10 MB, 100 MB, 1000 MB, and/or the like), that sensor data can be stored as sensor data 110 and categorized as part of stripe 1. Sensor 122 can also capture data over a period of time. Once sensor 122 has captured sensor data having substantially the same predetermined/predefined size, that sensor data can be stored as sensor data 120 and also categorized as part of stripe 1. Sensor 142 can also capture data over a period of time. Once sensor 142 has captured sensor data having substantially the same predetermined/predefined size, however, that sensor data can be stored as sensor data 154 and categorized as part of stripe 2 instead of stripe 1. Rather, sensor data 110 and sensor data 130 can be used to generate parity data 150, and parity data 150 can be stored as part of stipe 1 at sensor 142. Any erasure coding technique can be used to generate parity data 150 based on sensor data 110 and 130. In some implementations, "parity data" refers to error-correcting data that can be computed/generated based on original (e.g., video and/or sensor) data and used to recover original data if parts/portions of the original data are lost.

If sensor data 110 becomes inaccessible for whatever reason (e.g., memory 106 become corrupt, sensor 102 is broken etc.), the remaining data in the same stripe as sensor data 110—which in this case is sensor data 130 and parity data 150—can be used to recreate sensor data 100. Similarly, if sensor data 130 becomes inaccessible for whatever reason, the remaining data in the same stripe as sensor data 130—which in this case is sensor data 110 and parity data 150—can be used to recreate sensor data 130.

A similar process to that described for generating the data in stripe 1 can be performed for any number of stripes. In some implementations, the sensor that stores the parity data can vary/rotate across stripes. For example, once sensor 102 has captured additional sensor data having the predetermined/predefined size (after capturing sensor data 110), that additional sensor data can be stored as sensor data 114 and categorized as part of stripe 2. This time, however, once sensor 122 has captured additional sensor data having the predetermined/predefined size, that sensor data can be stored as sensor data 138 as part of stripe 3 instead of stripe 2. Sensor data 114 and sensor data 154 can be used to generate parity data 134 that is part of stripe 2 and stored at sensor 122. If sensor data 114 becomes inaccessible for whatever reason, the remaining data in the same stripe as sensor data 114—which in this case is sensor data 154 and parity data 134—can be used to recreate sensor data 114. Similarly, if sensor data 154 becomes inaccessible for whatever reason, the remaining data in the same stripe as sensor data 154—which in this case is sensor data 114 and parity data 134—can be used to recreate sensor data 154.

Furthermore, once sensor 142 has captured additional sensor data having the predetermined/predefined size (e.g., after sensor 152 has generated sensor data 154), that sensor data can be stored as sensor data 158 as part of stripe 3. Sensor 158 and sensor data 138 can then be used to generate parity data 118 for storing at sensor 102 as part of stripe 3. Because sensor 102 is storing parity data 118 as part of stripe 3, additional sensor data captured by sensor 102 having the predetermined/predefined size can be stored as sensor data (not shown in FIG. 1) as part of stripe 4 (not shown in FIG. 1). If sensor data 138 becomes inaccessible for whatever reason, the remaining data in the same stripe as sensor data 138—which in this case is sensor data 158 and parity data 118—can be used to recreate sensor data 138. Similarly, if sensor data 158 becomes inaccessible for whatever reason, the remaining data in the same stripe as sensor data 158—which in this case is sensor data 138 and parity data 118—can be used to recreate sensor data 158. Such a process as described above can be repeated for any number of stripes.

Database compute device 180 can be any type of compute device, such as a desktop, laptop, tablet, smartphone, internet of things device, and/or the like. Database compute device 180 can store indication of which sensor is storing which sensor data, which sensor is storing which parity data, what sensor data and parity data is part of what stripe, attributes associated with stripes (e.g., size, length, name, etc.), and/or the like. Although not explicitly shown in FIG. 1, database compute device 180 can include a processor operatively coupled to a memory.

User compute device 170 can also be any type of compute device, such as a desktop, laptop, tablet, smartphone, internet of things device, and/or the like. In some implementations, a user associated with (e.g., that owns, that has access to, that has permission to access, etc.) user compute device 170 requests a sensor data. In response to database compute device 180 determining that the sensor data is not accessible (e.g., the sensor and/or memory is broken), database compute device 180 can send an indication of the stripe associated with the requested, inaccessible sensor data to the other sensors of that fleet. Upon receiving the indication, the other sensors of that fleet and/or database compute device 180 can regenerate the requested sensor data and send a signal representing the requested sensor data to user compute device 170 (e.g., for displaying).

To provide an example with reference to FIG. 1, consider that sensor data 110 is stored at sensor 102 and part of stripe 1, sensor data 130 is stored at sensor 122 and part of stripe 1, and parity data 150 is stored at sensor 142 and part of stripe 1 is stored at database compute device 180. A user uses user compute device 170 to request sensor data 110, and user compute device 170 sends an electronic signal indicating that request to database compute device 180 via network 160. Subsequently, database compute device 180 determines that the requested sensor data 110 is inaccessible. For example, database compute device 180 may determine that sensor 102 is powered off, has not responded within a predefined amount of time, or sent an electronic signal indicating that sensor data 110 cannot be retrieved (e.g., corrupt, erased, etc.). In response to determining that the requested sensor data 110 is inaccessible, database compute device 180 determines that sensor data 110 is part of stripe 1, and requests the data as stored at the other sensors at stripe 1—sensor data 130 from sensor 122 and parity data 150 from sensor 142. Thereafter, sensor data 130 and parity data 150 is used to recreate sensor data 110 (e.g., at sensor 102, sensor 122, sensor 142, database compute device 180, and/or user compute device 170). Once recreated, the sensor data 110 is caused to be output at user compute device 170. Additionally, in some implementations, the newly generated sensor data 110 can be stored as part of stripe 1, e.g., replacing the previously corrupted sensor data 110. Alternatively or in addition, if memory 106 is no longer usable, memory 106 can be replaced with a new memory.

In some implementations, database compute device 180 is not used to regenerate lost sensor data and/or parity data. Rather, sensors can communicate and exchange data with each other to regenerate lost sensor data and/or parity data. For example, suppose that user compute device 170 sends a request for sensor data 110 to sensor 102. If sensor 102 determines that sensor data 110 is inaccessible or corrupt, but can determine that sensor data 110 was part of stripe 1, sensor 102 can send a signal indicating that sensor data 110 is inaccessible/corrupt and can send part of stripe 1 to sensors 122 and 142. In response, sensor 122 determines that sensor data 130 is part of stripe 1 and sensor 142 determines that parity data 150 is part of stripe 1, and sensor data 130 and parity data 150 are used to regenerate/reconstruct sensor data 110 (e.g., at sensor 102, sensor 122, sensor 142, and/or at user compute device 1700). For example, sensor 102 may receive sensor data 130 from sensor 122 and receive parity data 150 from sensor 142. Once the sensor data 110 has been regenerated/reconstructed, sensor 102 may send a representation of the regenerated/reconstructed sensor data 100 to user compute device 170 (e.g., for display thereon).

In some implementations, parity data is generated at sensor 102, 122, 142 and/or at database compute device 180. For example, database compute device 180 generates and sends parity data 150 to sensor 142 after (1) receiving sensor data 110 from sensor 102, (2) receiving sensor data 130 from sensor 122, and (3) generating parity data 150 based on sensor data 110 and sensor data 130. As another example, sensor 142 generates parity data 150 after (1) receiving sensor data 110 from sensor 102, (2) receiving sensor data 130 from sensor 122, and (3) generating parity data 150 based on sensor data 110 and sensor data 130.

In some implementations, parity data 150 can be created sequentially by sensors sending a portion of parity data to subsequent sensor in a serial process ending with the sensor to store the parity data having the full, final parity information. For example, as each sensor receives sensor data, that sensor adds its own parity component and forwards the resulting parity component to a different sensor for adding that different sensor's parity component until the final parity data has been generated and sent to the sensor assigned to store that parity data. In the context of FIG. 1, this may look like sensor 102 generating a first parity component based on sensor data 110, sending the first parity component to sensor 122, sensor 122 generating a second parity component based on the first parity component and sensor data 130, and sending the second parity component to sensor 142 for storing as parity data 150.

The process discussed with respect to FIG. 1 can occur for any number of stripes (e.g., 10, 100, 100, 10,000, etc.). Additionally, although not shown in FIG. 1, a similar process can occur for any number of sensors, such as two, four, five, 10, 100, 1,000, 10,000, etc.).

Note that the process discussed with respect to FIG. 1 had one sensor storing the parity data for a given stripe. By storing parity data at one sensor, sensor data captured by a sensor from a fleet of cameras can be retrieved even if one sensor is inaccessible. In some implementations, however, X (X being more than one) sensors can store parity data for a given stripe. In such a case, sensor data captured by a sensor from a fleet of sensors can be retrieved even if X sensors become inaccessible. For example, if a fleet of sensors has 100 sensors and 10 sensors store parity data for a given stripe, sensor data from that stripe and captured by a sensor from the fleet of sensors can be retrieved even if anywhere from one to 10 sensors becomes inaccessible. As another example, if a fleet of sensors has 10 sensors and two sensors stores parity data for a given stripe, sensor data from that stripe and captured by a sensor from the fleet of sensors can be retrieved even if anywhere from one to two sensors becomes inaccessible.

In some implementations, each stripe is associated with various data/attributes (e.g., stored at database compute device 180, sensor 102, sensor 122, sensor 142, and/or the like). For example, each stripe can be associated with a unique identifier. As another example, each stripe can be associated with a data length indicating the total length and/or size of that stripe. As another example, each stripe can be associated with a filename and/or a length; in some implementations, the filename of a stripe includes representation of the unique identifier for the stripe. As another example, each stripe can be associated with a bitmask (e.g., that shows which stripe parity data or sensor data is part of).

In some implementations, the filename each sensor data is associated with an identifier that uniquely identifies the filename within the system, and the filename of each stripe includes an indication of that identifier, for all sensor data that is part of that stripe. That way, if particular sensor data becomes inaccessible, a stripe that includes the identifier for that inaccessible sensor data can be quickly/readily identified and used for regenerating/reconstructing the inaccessible/corrupt sensor data.

In some implementations, where a memory of a sensor has become inaccessible or no longer works as desired, the sensor can be replaced with a new memory. For example, if sensor data 110 and 114 becomes inaccessible because memory 106 isn't functioning properly, a new memory can be included in sensor 102, and sensor data 110 and 114 can be retrieved and stored in the new memory using the techniques described herein.

Sensors 102, 122, 142 can operate at the same sampling rate, different sampling rate, or a combination thereof. For example, if sensors 102, 122, 142 are cameras, the cameras can operate at the same video data capture rate and/or different video data capture rates.

In some implementations, a sensor can delete sensor data. For example, sensor 102 can delete sensor data 110. In some implementations, a sensor does not delete sensor data until database compute device 180 and/or each remaining sensor in the fleet has provided indication that deleting the sensor data is okay. For example, sensor 102 does not delete sensor data 110 until after sensors 122 and 142 have provided indication that deleting sensor data 110 is permitted.

In some implementations, all sensor data that is part of a stripe(s) (e.g., sensor data 110, 114, 130, 138, 154, 158, etc.) has the same size or substantially (e.g., within 1%, within 5%, within 10%, or within 25%) the same size. In some implementations, some sensor data that is part of a stripe(s) (e.g., sensor data 110, 114, 130, 138, 154, 158, etc.) does not have substantially (e.g., not within 1%, not within 5%, not within 10%, or not within 25%) the same size as other sensor that is part of that stripe or those stripes. In some implementations, all sensor data that is part of a single stripe (e.g., sensor data 110, 114, 130, 138, 154, 158, etc.) was captured at substantially (e.g., within 1%, within 5%, within 10%, or within 25%) the same time. In some implementations, some sensor data that is part of a single stripe (e.g., sensor data 110, 114, 130, 138, 154, 158, etc.) was not captured at substantially (e.g., within 1%, within 5%, within 10%, or within 25%) the same time.

In some implementations, sensor data that is part of a stripe but does not have the same size as other sensor data part of the stripe can be zero-padded so that the sizes of sensor data at that stripe are the same (and/or substantially the same), for example prior to a parity/EC computation. In some implementations, sensor data that is part of a stripe but is larger than other sensor data part of the stripe can include such an indication so that sensor data at the next stripe is also read/analyzed/considered.

In some implementations, a detection is made that a sensor has failed based on the sensor sending an electronic signal (e.g., to database compute device 180) indicating that the sensor has failed and/or the type of failure. Failure can be detected based on, for example, hardware (e.g., accelerometer(s)) in the sensor producing a value(s) outside a predetermined/predefined acceptable range, a memory/SD card of the sensor not being recognized, an operating system malfunction, an unexpected event during bootup, an error in initialization of a hardware component or communication bus, and/or the like.

Note that the discussion with respect to FIG. 1 was about a single fleet of sensors, where sensors 102, 122, and 142 made up the fleet. Techniques described herein however can be applied to any number of fleets. Different fleets can have the same number of sensors within each fleet, a different number of sensors within each fleet, or a combination of some fleets with the same number of sensors and different fleets with a different number of sensors. For example, a first fleet made up of dome cameras may include a first number of cameras, a second fleet made up of bullet cameras may also include the first number of cameras, and a third fleet made up of temperature sensors may include a second number of temperature sensors different than the first number.

Figure 2A:
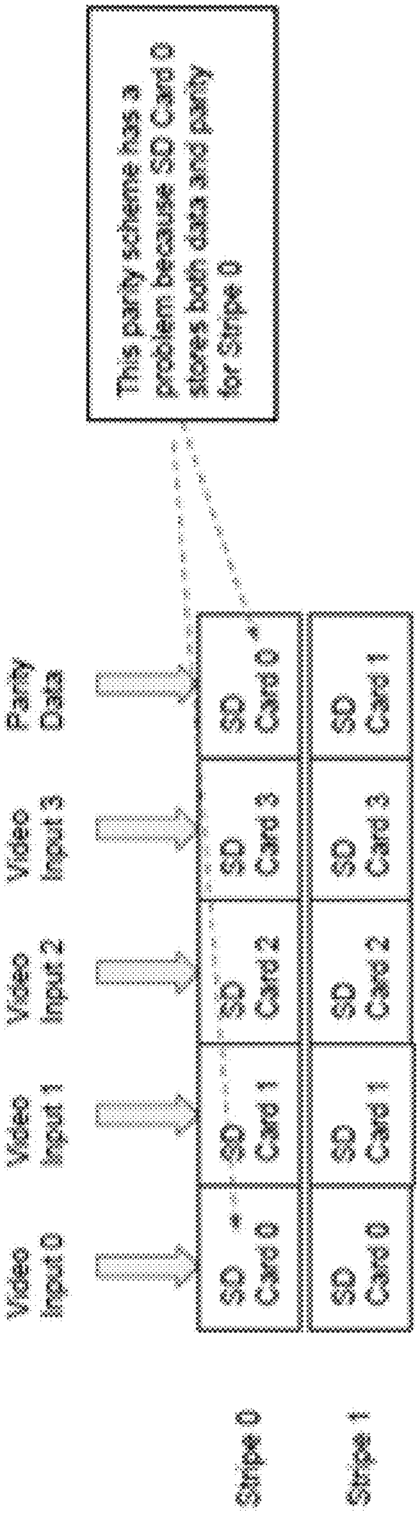
FIG. 2A illustrates an example of a technique for storing video files and parity data using a fleet of four cameras.

FIG. 2A shows an example of a technique for storing video files and parity data at four cameras making up a fleet. SD card 0 can be an SD card configured to store video data captured by video input 0 (e.g., captured by a first camera), SD card 1 can be an SD card configured to store video data captured from video input 1 (e.g., a second camera), SD card 2 can be an SD card configured to store video data captured by video input 2 (e.g., a third camera), and SD card 3 can be an SD card configured to store video data captured by video input 3 (e.g., a fourth camera). Video data from video inputs 0, 1, 2, and 3 can be partitioned into stripes (e.g., stripe 0, strip 1, etc.). For each stripe, one of the SD cards can store parity data. For example, as shown in FIG. 2A, SD card 0 stores the parity data for stripe 0 and SD card 1 stores the parity data for stripe 1. The technique shown at FIG. 2A may not always be desirable, however, because for a given stripe, a single SD card stores both video data and parity data. For example, SD card 0 stores both video data from video input 0 and parity data at stripe 0, and SD card 1 stores both video data from video input 1 and parity data at stripe 1. If an SD card storing both video data and parity data becomes inaccessible (e.g., SD card or camera becomes lost, broken, corrupt, etc.), none of the remaining video data in the same stripe will be retrievable. For example, if SD card 0 breaks, none of the video data at stripe 0 is retrievable if lost. Similarly, if SD card 1 breaks, none of the video data at stripe 1 is retrievable if lost.

Figure 2B:
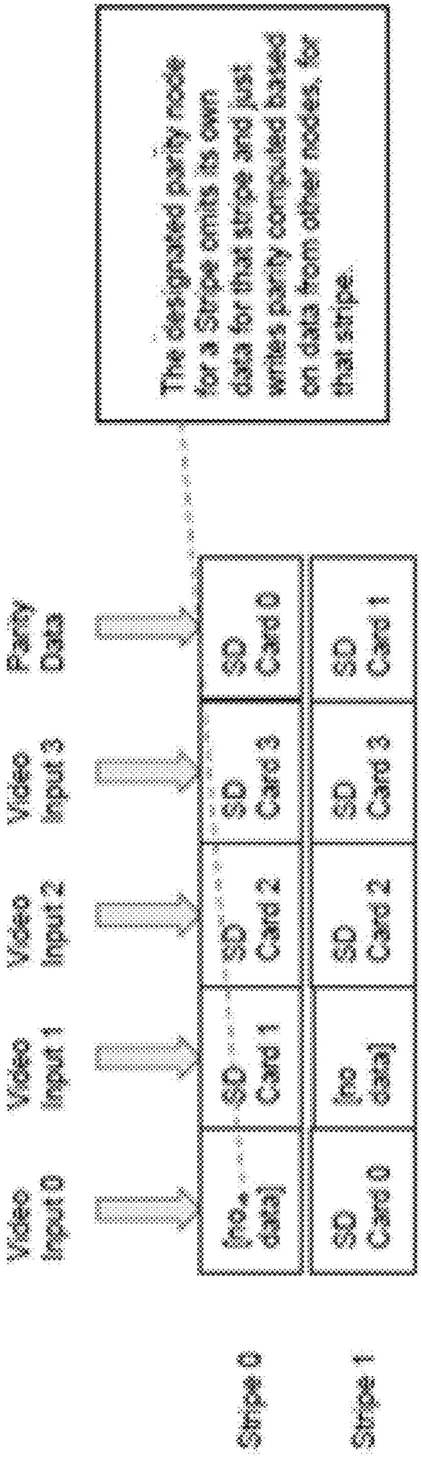
FIG. 2B illustrates a scenario in which no SD card stores both video data and parity data in a single stripe, according to an embodiment.

To address such deficiencies, some implementations described herein are related to not having an SD card store both video data and parity data in a single stripe. Rather, the SD card storing the parity data for a given stripe may store video data at a different stripe. FIG. 2B illustrates a scenario in which no SD card (e.g., in a given fleet) stores both video data and parity data in a single stripe, according to an embodiment. As shown in FIG. 2B, SD card 0 stores the parity data but not video data from video input 0. Rather, video data from video input 0 is stored at a different stripe (here, stripe 1). Thus, any video data can be recovered even if an SD card becomes inaccessible. For example, if video data stored at stripe 0 of SD card 1 becomes inaccessible, video data stored at SD card 2 of stripe 0, video data stored at SD card 3 of stripe 0, and parity data stored at SD card 0 of stripe 0 can be used to retrieve the video data that become inaccessible.

Figure 2C:
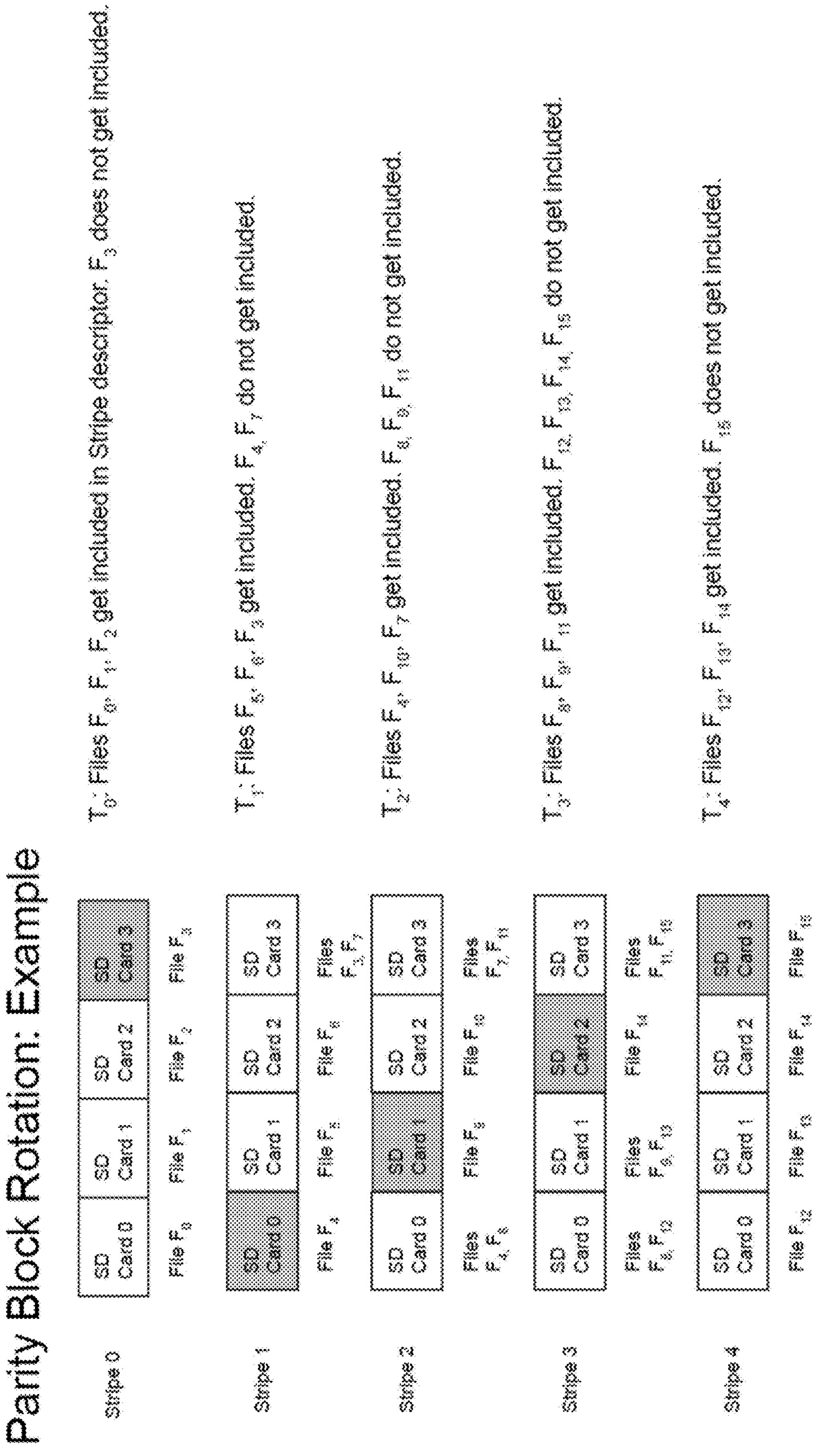
FIG. 2C shows an example of storing video files and parity data using multiple SD cards, according to an embodiment.

FIG. 2C shows an example of storing video files and parity data using multiple SD cards, according to an embodiment. More specifically, FIG. 2C shows stripe updates for a set of 4 SD cards. On each update, one SD card does not incorporate its video data, but incorporates the parity data, to avoid having two fragments (i.e., video data) from the same device (e.g., sensor and/or SD card) on any given stripe. On the fifth update, the sequence may repeat. The shaded boxes indicate parity blocks.

As shown in FIG. 2C, stripe 0 (at a first time, To) includes: video file $F_0$ stored at a first SD card (SD Card 0) included in a first sensor; video file $F_1$ stored at a second SD card (SD Card 1) included in a second sensor; video file $F_2$ stored at a third SD card (SD Card 0) included in a third sensor; and parity data generated based on video files $F_0$, $F_1$, and $F_2$ stored at a fourth SD card (SD card 3). Stripe 1 (at a second time, $T_1$) includes: video file $F_5$ stored at the second SD card; video file $F_6$ stored at the third SD card; video file $F_3$ stored at the fourth SD card; and parity data generated based on video files $F_5$, $F_6$, and $F_3$ stored at the first SD card. Stripe 2 (at a third time, $T_2$) includes: video file $F_4$ stored at the first SD card; video file $F_{10}$ stored at the third SD card; video file $F_7$ stored at the fourth SD card; and parity data generated based on video files $F_4$, $F_{10}$, and $F_7$ stored at the second SD card. Stripe 3 (at a fourth time, $T_3$) includes: video file $F_8$ stored at the first SD card; video file $F_9$ stored at the second SD card; video file $F_{11}$ stored at the fourth SD card; and parity data generated based on video files $F_8$, $F_9$, and $F_{11}$ stored at the third SD card. Stripe 4 (at a fifth time, $T_4$) includes: video file $F_{12}$ stored at the first SD card; video file $F_{13}$ stored at the second SD card; video file $F_{14}$ stored at the third SD card; and parity data generated based on video files $F_{12}$, $F_{13}$, and $F_{14}$ stored at the fourth SD card. Such a process can occur for any number of stripes. Notice that sensor data and parity data for a single given stripe are not stored at a single SD card.

If, for example, video file $F_0$ becomes inaccessible, video file $F_1$, video file $F_2$, and the parity data stored at the SD Card 3 as part of Stripe 0 can be used to recover video file $F_0$. If, as another example, video file $F_3$ becomes inaccessible, video file $F_5$, video file $F_6$, and the parity data stored at the SD Card 0 as part of Stripe 1 can be used to recover video file $F_3$.

Note that, in FIG. 2C: video file $F_{12}$ is generated after video file $F_8$, video file $F_8$ is generated after video file $F_4$, video file $F_4$ is generated after video file $F_0$, video file $F_{13}$ is generated after video file $F_9$, video file $F_9$ is generated after video file $F_5$, video file $F_5$ is generated after video file $F_1$, video file $F_{14}$ is generated after video file $F_{10}$, video file $F_{10}$ is generated after video file $F_6$, video file $F_6$ is generated after video file $F_2$, video file $F_{15}$ is generated after video file $F_{11}$, video file $F_{11}$ is generated after video file $F_7$, and video file $F_7$ is generated after video file $F_3$.

Note that in FIG. 2C, each stripe had one SD card storing the parity data. Accordingly, video data can be recovered if one sensor and/or SD card is inoperable. In other implementations, each stripe can have multiple SD cards storing parity data, in which case video data can be recovered even if a corresponding number of sensors and/or SD cards become inoperable.

Figure 3:
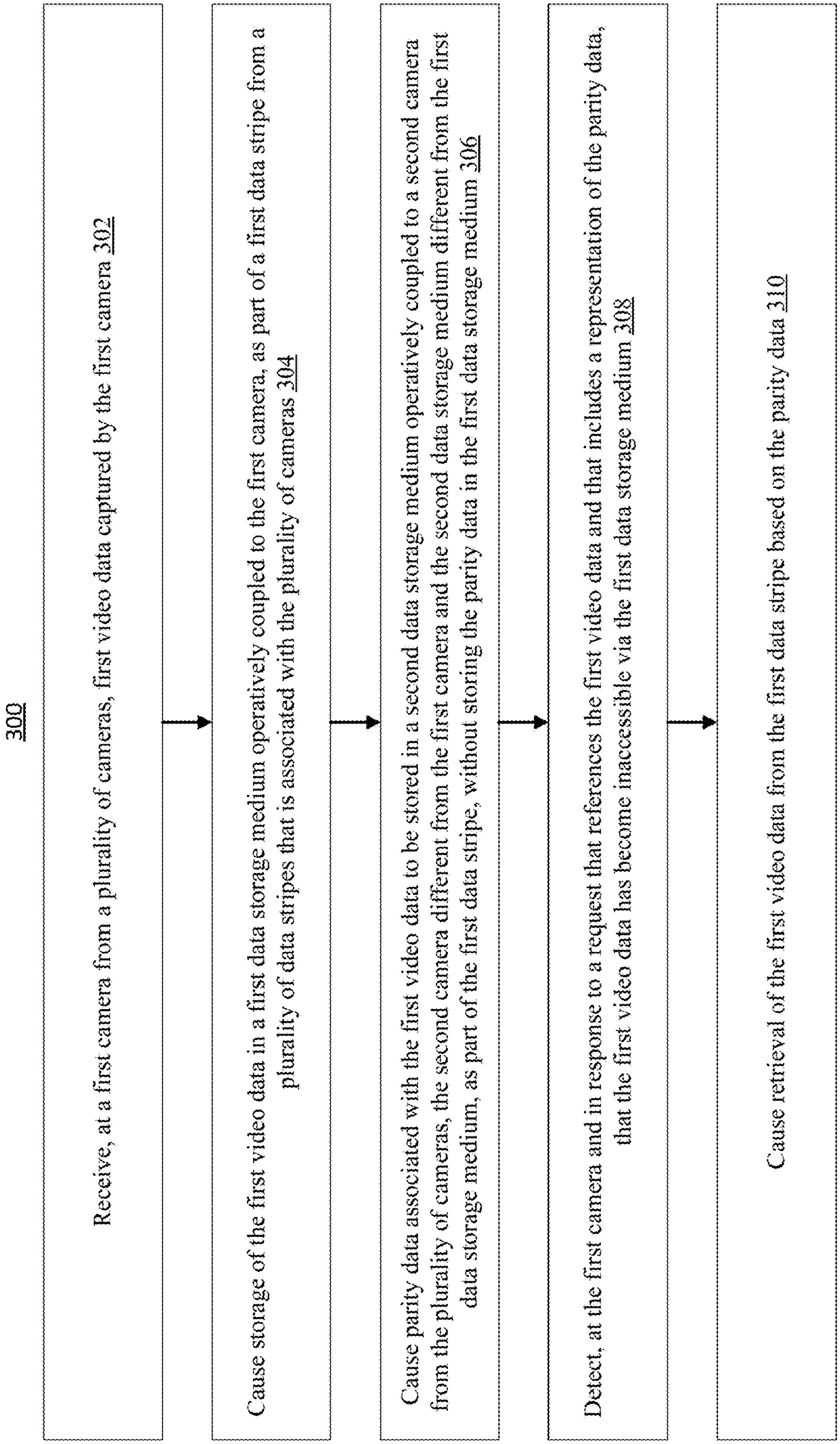
FIG. 3 is a flowchart showing a method for recovering video data that was stored at a data storage medium operatively coupled to a first camera using parity data stored at a second camera, according to an embodiment.

FIG. 3 shows a flowchart of a method 300 to recover video data that was stored at a data storage medium operatively coupled to a first camera using parity data stored at a second camera, according to an embodiment. In some implementations, method 300 is performed by a processor (e.g., processor 102, 124, 144).

At 302, first video data (e.g., sensor data 110) captured by a first camera (e.g., sensor 102) from a plurality of cameras (e.g., sensors 102, 122, 142) is received. At 304, the first video data is caused to be stored in a first data storage medium (e.g., memory 106) operatively coupled to the first camera as part of a first data stripe (e.g., stripe 1) from a plurality of data stripes (e.g., stripe 1, stripe 2, stripe 3, etc.) that is associated with the plurality of cameras. In some implementations, 304 occurs automatically (e.g., without human intervention) in response to completing 302. At 306, parity data (e.g., parity data 150) associated with the first video data is caused to be stored in a second data storage medium (e.g., memory 146) operatively coupled to a second camera (e.g., sensor 142) from the plurality of cameras as part of the first data stripe without storing the parity data in the first data storage medium. The second camera is different from the first camera and the second data storage medium is different from the first data storage medium. In some implementations, 306 occurs automatically (e.g., without human intervention) in response to completing 304. At 308, a detection is made, at the first camera and in response to a request that references the first video data and that includes a representation of the parity data, that the first video data has become inaccessible via the first data storage medium. 308 can occur any time after 306, such as immediately after completing 306, one day later, one year later, one decade later, and/or the like. At 310, the first video data is caused to be retrieved from the first data stripe based on the parity data. In some implementations, 310 occurs automatically (e.g., without human intervention) in response to completing 308.

In some implementations of method 300, second video data (e.g., sensor data 154) captured by the second camera is stored in a second data stripe (e.g., stripe 2) from the plurality of data stripes, the second data stripe being different from the first data stripe.

Some implementations of method 300 further include receiving the request (from step 308) from a remote compute device (e.g., database compute device 180 and/or user compute device 170) before the detecting that the first video data has become inaccessible. Some implementations of method 300 further include causing transmission, from the first camera, of a signal including a representation of an identifier associated with the first data stripe to each remaining camera from the plurality of cameras. Some implementations of method 300 further include receiving, from at least one camera from the plurality of cameras and in response to the signal: (1) the parity data and (2) second video data (e.g., sensor data 130) that (a) was stored by at least one camera (e.g., sensor 122) from the plurality of cameras excluding the second camera, and (b) is part of the first data stripe, the causing retrieval of the first video data at step 310 being based on at least the parity data and the second video data.

In some implementations of method 300, the first data stripe does not include any other parity data except the parity data.

In some implementations of method 300, the parity data is first parity data and the first data stripe further includes second parity data (e.g., not shown in the FIG. 1) that is stored, as part of the first data stripe, in a third data storage medium operatively coupled to a third camera from the plurality of cameras different from the first camera and the second camera.

In some implementations of method 300, each data stripe from the plurality of data stripes is associated with a unique data stripe identifier (ID) from a plurality of data stripe identifiers.

In some implementations of method 300, each data stripe from the plurality of data stripes is associated with (1) a unique data stripe identifier (ID) from a plurality of data stripe identifiers, (2) a data length, (3) a filename, and (4) a bitmask.

In some implementations of method 300, the first camera is configured to operate at a first video data capture rate and the second camera is configured to operate at a second video data capture rate different from the first video data capturing rate.

In some implementations of method 300, the first camera and the second camera are configured to operate at a common video data capture rate.

In some implementations of method 300, the parity data is first parity data, and method 300 further includes receiving, at the first camera, second video data (e.g., sensor data 114) captured by the first camera. Some implementations of method 300 further includes causing storage of the second video data in at least one of the first data storage medium or a third data storage medium operatively coupled to the first camera as part of a second data stripe (e.g., stripe 2) from the plurality of data stripes. In some implementations, the third data storage medium is a replacement data storage medium for the first data storage medium if the first data storage medium is no longer usable. Some implementations of method 300 further include causing second parity data (e.g., parity data 134) associated with the second video data to be stored at third camera (e.g., sensor 122) from the plurality of cameras, the third camera different from the first camera and the second camera, as part of the second data stripe. Some implementations of method 300 further include detecting that the second video data has become inaccessible via the at least one of the first data storage medium or the third data storage medium. Some implementations of method 300 further include causing retrieval of the second video data based on the second data stripe and not based on the first data stripe.

In some implementations of method 300, the parity data is first parity data and method 300 further includes causing storage of second parity data (e.g., parity data 118) associated with second video data (e.g., sensor data 138) captured by at least one camera (e.g., sensor 122) from the plurality of cameras, in at least one of the first data storage medium or a third data storage medium operatively coupled to the first camera, as part of a second data stripe (e.g., stripe 3) from the plurality of data stripes different from the first data stripe, the second video data different from the first video data. In some implementations, the third data storage medium is a replacement data storage medium for the first data storage medium if the first data storage medium is no longer usable.

Figure 4:
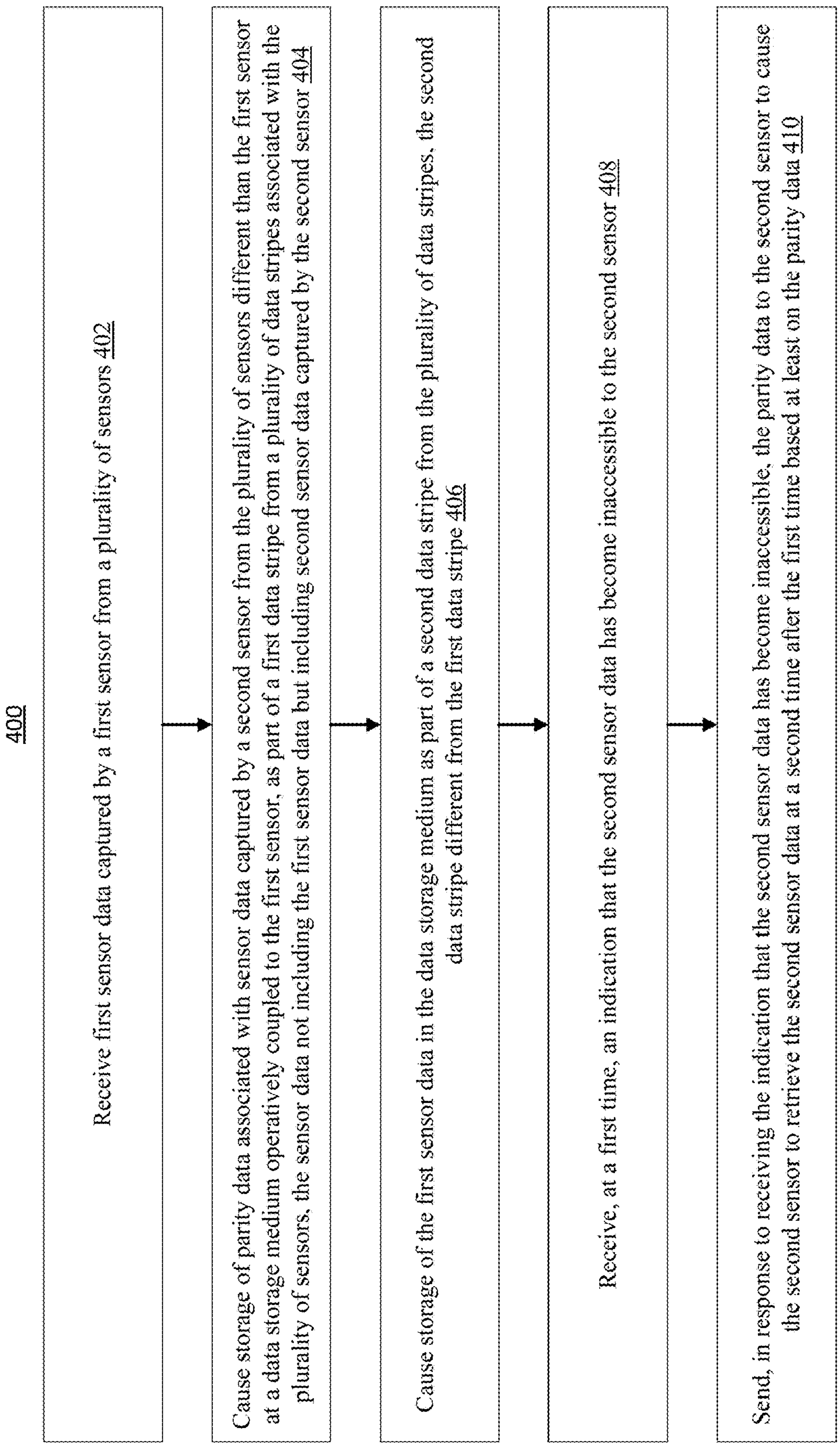
FIG. 4 is a flowchart showing a method for storing parity data and sensor data at different stripes, according to an embodiment.

FIG. 4 shows a flowchart of a method 400 to store parity data and sensor data at different stripes, according to an embodiment. In some implementations, method 400 is performed by a processor (e.g., processor 104, 124, and/or 144).

At 402, first sensor data (e.g., sensor data 154) captured by a first sensor (e.g., sensor 142) from a plurality of sensors (e.g., sensors 102, 122, and 142) is received. At 404, parity data (e.g., parity data 150) associated with sensor data (e.g., sensor data 110 or 130) captured by a second sensor (e.g., sensor 102 or 122) from the plurality of sensors different than the first sensor is caused to be stored at a data storage medium (e.g., memory 146) operatively coupled to the first sensor as part of a first data stripe (e.g., stripe 1) from a plurality of data stripes associated with the plurality of sensors. The sensor data does not include the first sensor data but includes second sensor data (e.g., sensor data 110 or 130) captured by the second sensor. In some implementations, 404 occurs automatically (e.g., without human intervention) in response to completing 402. At 406, the first sensor data is caused to be stored in the data storage medium as part of a second data stripe (e.g., stripe 2) from the plurality of data stripes. The second data stripe is different from the first data stripe. In some implementations, 406 occurs automatically (e.g., without human intervention) in response to completing 402 and/or 404. At 408, an indication that the second sensor data has become inaccessible to the second sensor is received at a first time. At 410, in response to receiving the indication that the second sensor data has become inaccessible, the parity data is sent to the second sensor to cause the second sensor to retrieve the second sensor data at a second time after the first time based at least on the parity data. In some implementations, 410 occurs automatically (e.g., without human intervention) in response to completing 408.

Some implementations of method 400 further include receiving an indication that the first sensor data has become inaccessible. Some implementations of method 400 further include receiving, at a camera that includes the first sensor, data (e.g., sensor data 114 and parity data 134) associated with the second data stripe from each remaining sensor from the plurality of sensors. Some implementations of method 400 further include generating the first sensor data based on the received data.

In some implementations of method 400, a size of the first sensor data is different from a size of the second sensor data.

In some implementations of method 400, the plurality of sensors includes a plurality of cameras.

Figure 5:
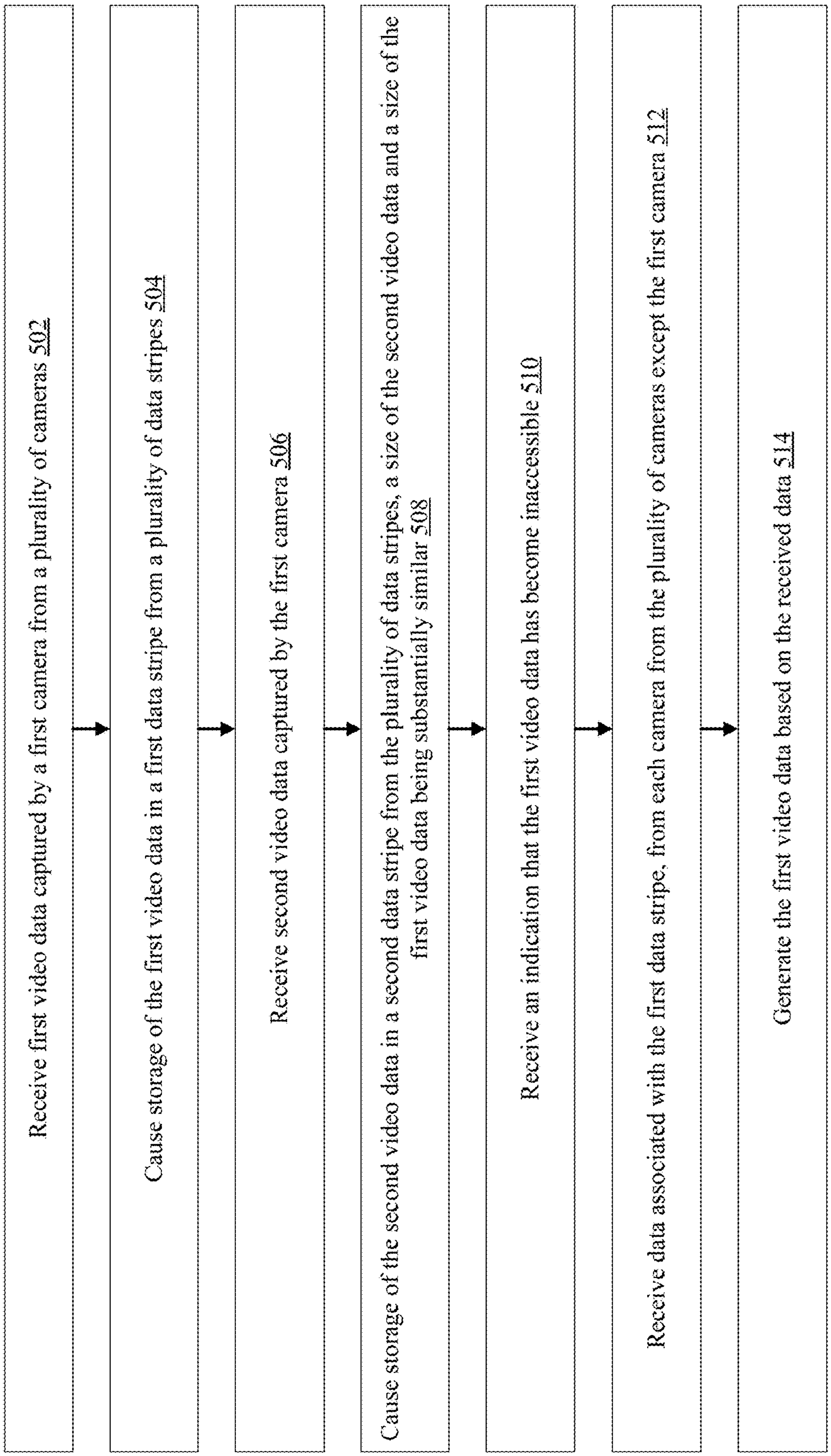
FIG. 5 is a flowchart showing a method for recovering video data that has become inaccessible and is part of a stripe, using remaining data from the stripe, according to an embodiment.

FIG. 5 shows a flowchart of a method 500 to recover video data that has become inaccessible and is part of a stripe using remaining data from the stripe, according to an embodiment. In some implementations, method 500 is performed by a processor (e.g., processor 104, 124, 144).

At 502, first video data (e.g., sensor data 110) captured by a first camera (e.g., sensor 102) from a plurality of cameras (e.g., sensors 102, 122, and 142) is received. At 504, the first video data is caused to be stored in a first data stripe (e.g., stripe 1) from a plurality of data stripes (e.g., stripes 1, 2, and 3). In some implementations, 504 occurs automatically (e.g., without human intervention) in response to completing 502. At 506, second video data (e.g., sensor data 114) captured by the first camera is received. At 508, the second video data is caused to be stored in a second data stripe (e.g., stripe 2) from the plurality of data stripes. A size of the second video data and a size of the first video data are substantially (e.g., within 1%, within 5%, within 10%, within 25%, and/or the like) similar. In some implementations, 508 occurs automatically (e.g., without human intervention) in response to completing 506. At 510, an indication is received that the first video data has become inaccessible. At 512, data (e.g., sensor data 130 and parity data 150) associated with the first data stripe is received from each camera from the plurality of cameras except the first camera. In some implementations, 512 occurs automatically (e.g., without human intervention) in response to completing 510. At 514, the first video data is generated based on the received data. In some implementations, 514 occurs automatically (e.g., without human intervention) in response to completing 512.

Some implementations of method 500 further include receiving an indication that the second video data has become inaccessible. Some implementations of method 500 further include receiving data (e.g., parity data 134 and sensor data 154) associated with the second data stripe from each camera from the plurality of cameras except the first camera and in response to the receiving the indication that the second video data has become inaccessible. Some implementations of method 500 further include generating the second video data based on the data associated with the second data stripe and received from each camera from the plurality of cameras except the first camera.

Some implementations of method 500 further include receiving an indication that third video data (e.g., sensor data 130) captured by a second camera (e.g., sensor 122) from the plurality of cameras has become inaccessible, the third video data stored in the first data stripe. Some implementations of method 500 further include causing transmission of the first video data to the second camera to cause the second camera to generate the third video data based on at least the first video data.

Some implementations of method 500 further include storing parity data (e.g., parity data 118) associated with third video data (e.g., sensor data 138 and 158) captured by the plurality of cameras, the parity data associated with a third data stripe (e.g., stripe 3) from the plurality of data stripes. Some implementations of method 500 further include receiving an indication that fourth video data (e.g., sensor data 138) captured by a second camera (e.g., sensor 122) from the plurality of cameras has become inaccessible, the fourth video data included in the third video data. Some implementations of method 500 further include causing transmission of the parity data to the second camera to cause the second camera to generate the fourth video data based on at least the parity data.

Some implementations of method 500 further include receiving an indication to delete the first video data. Some implementations of method 500 further include receiving a signal representing consensus among the plurality of cameras that deletion of the first video data is permissible. Some implementations of method 500 further include causing deletion of the first video data based on the consensus and the indication to delete.

Figure 6A:
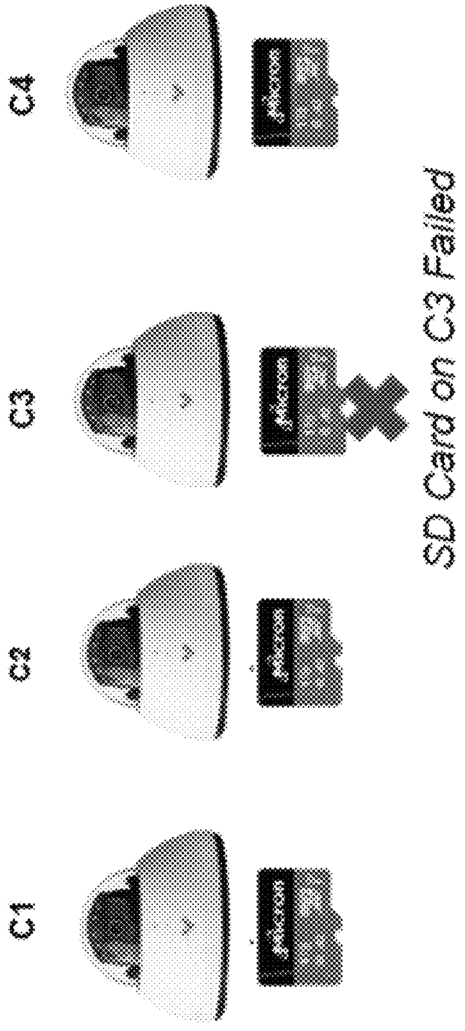
FIG. 6A illustrates a failed SD card at a camera, according to an embodiment.

Video data can become inaccessible for various reasons. For example, as shown in FIG. 6A, for a fleet of four cameras (C1, C2, C3, C4), an SD card at a given camera can fail (e.g., due to overheating or water damage), even if the camera itself remains otherwise operational. If the SD card fails, the data on that SD card may become inaccessible. Following the example shown in FIG. 6A, assume that the SD card on camera 3 (C3) has failed, the camera C3 is otherwise operational, and local network connectivity via ethernet switch is available. According to one or more methods described herein, this scenario may be addressed as follows. The handling of the SD card failure may be largely transparent to clients of the storage layer, e.g., provided there are enough functional SD cards in the fleet/EC set with parity information. Data that existed on the failed SD card will be generated (e.g., upon or in response to a request) by accessing the redundant data on other SD cards in the EC set. Incoming data may continue to be written out to surviving SD cards on other cameras. Depending on the number of failures, the fault tolerance of the EC set may or may not be reduced. Data read requests may be serviced by the stripe manager fetching parity information from peer nodes and/or by applying an EC decode algorithm. In some implementations, an EC decode algorithm recovers missing or lost data by applying an error correction code on the data present (e.g., in the same stripe as the missing data). In some cases the EC decode algorithm includes multiplying the stripe data (e.g., from one or more of the surviving storage devices) with the multiplicative inverse of a matrix that was used in the EC encode algorithm to generate the parity data. Examples of EC algorithms include those that use Galois finite field arithmetic using a matrix and its multiplicate inverse to encode and decode data, respectively (these are error correction codes that can recover or regenerate parts of data that are lost).

Figure 6B:
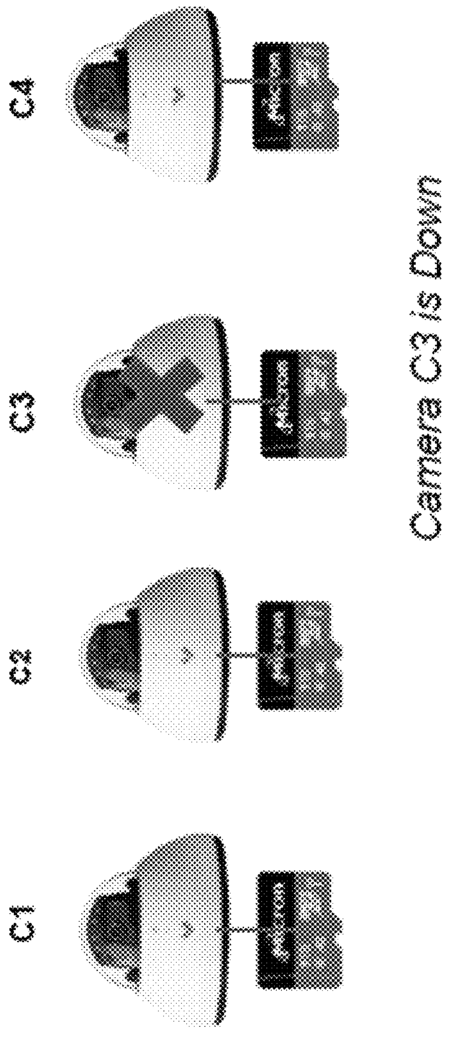
FIG. 6B illustrates a failed camera, according to an embodiment.

As another example, as shown in FIG. 6B, the camera can fail (e.g., due to overheating or water damage), even if the SD card remains operational. If the camera fails, data stored on the SD card of the failed camera might not be accessible or sharable (e.g., to a remote user that wants to video the data captured by the failed camera). Techniques described herein can recover data regardless of whether the SD card and/or camera fails. For example, following the example shown in FIG. 6B, assume that camera 3 (C3) has failed and local network connectivity via ethernet switch is available. According to one or more methods described herein, this scenario may be addressed as follows. The data that existed on the down camera can be generated (e.g., upon or in response to a request) by accessing the redundant data on SD cards in the other cameras in the EC set (e.g., via a request issued by a backend compute device). Data read requests maybe serviced by the stripe manager fetching parity information from peer nodes and applying an EC decode algorithm. Depending on the number of down cameras, the fault tolerance of the EC set may or may not be reduced.

Figure 7A:
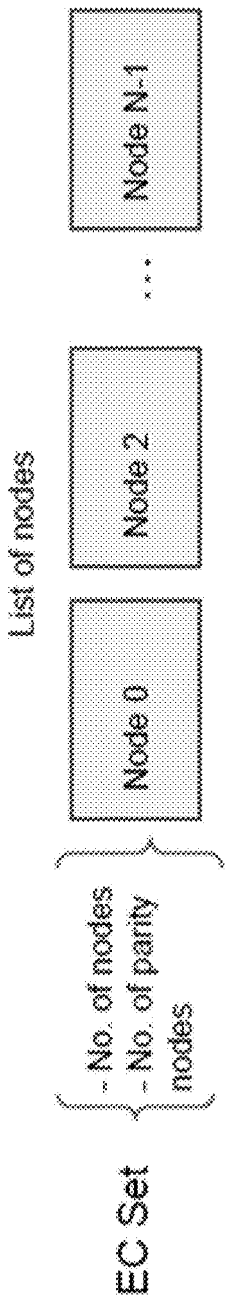
FIG. 7A illustrates a set of nodes that are part of a fault tolerance group, according to an embodiment.
Figure 7B:
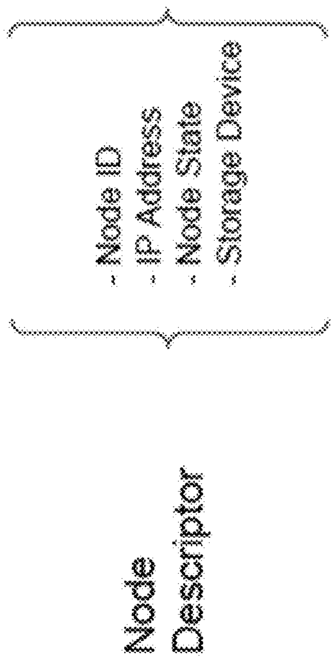
FIG. 7B illustrates node descriptors associated with a node, according to an embodiment.
Figure 7C:
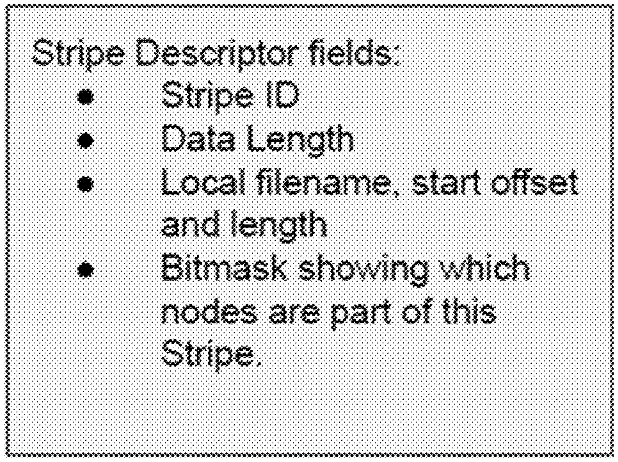
FIG. 7C shows example stripe descriptor fields that can be associated with each stripe, according to an embodiment.
Figure 7D:
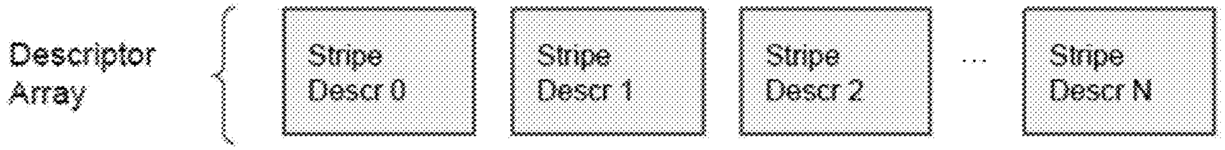
FIG. 7D illustrates a descriptor array including multiple stripe descriptions, according to an embodiment.
Figure 7E:
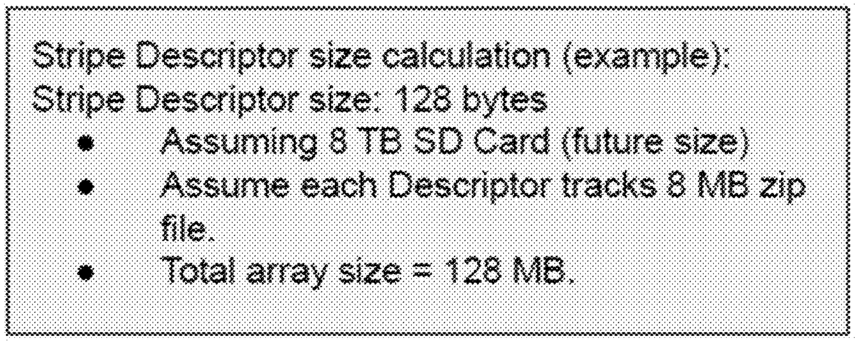
FIG. 7E shows an example size calculation for a stripe descriptor size, according to an embodiment.

FIGS. 7A to 7E illustrate representations of nodes, node descriptions, stripe descriptor fields, and description arrays, according to an embodiment. FIG. 7A illustrates a set of nodes that are part of, or that form, a fault tolerance group (i.e., a "fleet" or erasure coding (EC) "set"). An example of a node is a camera. For a given fleet, there can be a predetermined/predefined number of nodes. For a given fleet, there can also be a predetermined/predefined number of nodes that are to act as parity nodes (e.g., one node, two nodes, three nodes, etc.). Each node can be associated with a node descriptor, examples of which are shown in FIG. 7B. For a given node, the node descriptor can indicate a unique identifier ("node ID") associated with that node (e.g., a serial number), an internet protocol (IP) address associated with that node, a node state of that node (e.g., on, off, sleep, etc.), a storage device included in that node (e.g., storage device identifier, storage device size, number of storage devices, etc.), and/or the like. FIG. 7C shows example stripe descriptor fields that can be associated with each stripe, according to an embodiment. The stripe descriptor fields for a given stripe can include: a stripe ID unique to that stripe, a data length indicating a length of the stripe, a local filename with a length indicating a length of the associated file and a bitmask showing which nodes are part of that stripe. An example descriptor array including multiple stripe descriptions is shown in FIG. 7D. Each descriptor in the descriptor array (e.g., stripe descriptor 0, stripe descriptor 1, stripe descriptor 2, . . . stripe descriptor N) can be associated with or can include fields such as those shown in FIG. 7C. A size of a descriptor array can also be calculated, for example as shown in FIG. 7E, where an 8 TB card has room for 1 million 8 MB files. Each file can be represented by a descriptor of 128 bytes, so 128 MB in total (128×1 million bytes).

Figure 8:
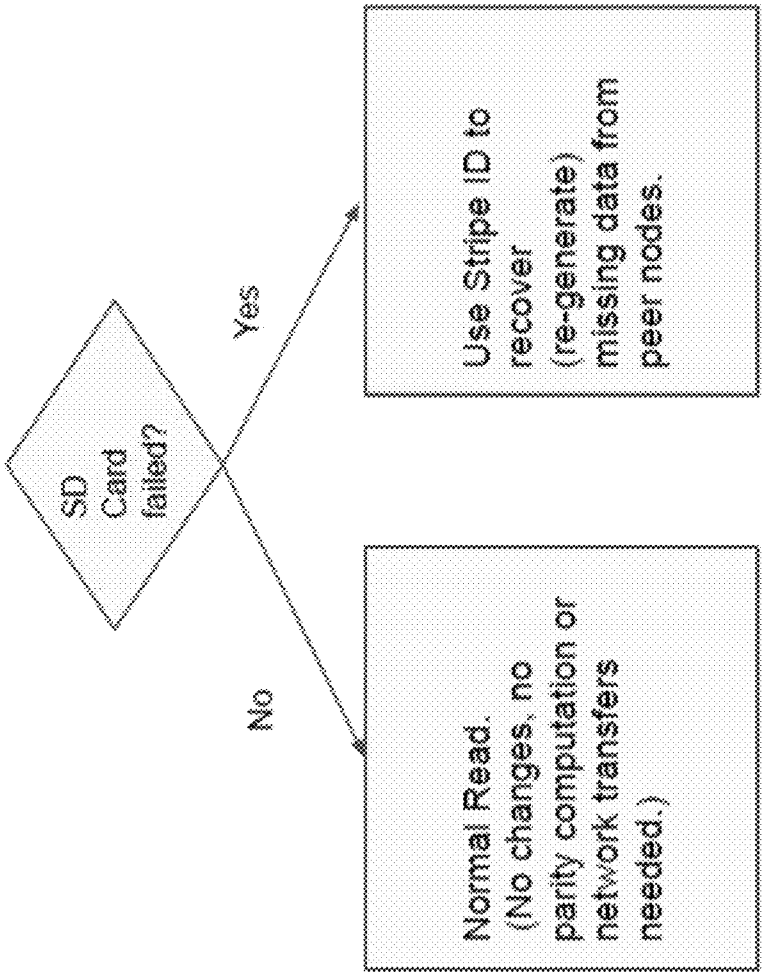
FIG. 8 is a flowchart illustrating a first example of what occurs at a sensor when requesting video data from an SD card, including the handling of an SD card failure, according to an embodiment.

FIG. 8 is a flowchart illustrating a first example of what occurs at a sensor when requesting video data from an SD card, including the handling of an SD card failure, according to an embodiment. If an SD card has failed, the stripe identifier(s) associated with requested video data can be determined (e.g., via a processor of the sensor), and the other video data and parity data at the stripe(s) associated with the determined stripe identifier(s) can be used to recover data from the failed SD card. If the SD does not fail, the video data can be read from the SD card (e.g., via the processor of the sensor).

One or more embodiments of the present disclosure differ from known erasure coding methods in that cameras with variable data rates can be accommodated using fixed-size stripe descriptors, and/or in that the relative priority of video files based on video resolution can be used to enable and/or disable erasure coding. Moreover, in some embodiments, a distributed algorithm is used to divide one or more computational tasks (e.g., stripe encoding) evenly or according to a predefined distribution across the processing units of multiple cameras/sensors. Relative priority can be used (e.g., by sensor 102, 122, 142 and/or database compute device 180) to determine which types of data should be placed in a stripe. For example, both high-resolution and low-resolution data can be generated by cameras (e.g., sensors 102, 122, 152), and in some implementations a parity stripe may include only one type of resolution (either high-resolution or low-resolution), to ensure that the associated file sizes are approximately equal to one another, since high-resolution data can lead to larger file sizes and low-resolution data can lead to smaller file sizes.

In some embodiments, all data and metadata are stored above the filesystem level. Stripes may be tracked using the array of strip descriptors (as shown in FIG. 7D). For example, each descriptor may have an associated integer ID that is incremented globally across all nodes using a distributed protocol (e.g., Raft). In the absence of failures, files may be read in the same code path as for non-EC configurations, and all file data may be read locally. In some implementations, files (e.g., zip files) containing multiple video files may be named so that they contain the stripe ID as part of the filename. This can facilitate the reading of the file data from other nodes using the strip ID, if desired, using the error recovery code path. Stripe information may be stored in descriptors that are stored as part of an array of elements (e.g., fixed-size elements) in a filesystem (e.g., a local filesystem). Files less than the length of a stripe may be identified by their length being less than the stripe length. In such instances, the file data may be padded with zeros before being input to the EC decode algorithm. Files exceeding the length of a stripe may be identified by their length being more than the stripe length, which can indicate that the subsequent stripe is also to be read.

The descriptor can store the offset for the next read. Parity may be rotated across SD cards (e.g., as shown in FIG. 2C). If a given SD card is the designated parity for a stripe, it need not store its own data in that stripe number, thereby avoiding having both data and parity on the same SD card in the same fragment. The SD card may use the next stripe ID for its data. One or more distributed protocols (e.g., Raft or Paxos) may be used to avoid cluster split-brain scenarios (e.g., to achieve agreement on which SD card has failed). If an SD card fails, the associated node may initiate a distributed protocol message to transition its state to 'Failed'. Subsequently, a storage layer may invoke the error recovery path for all inputs to/outputs from that SD card. If a node is unresponsive, it may be omitted from a current stripe, and may eventually transition to 'failed' when all nodes recognize the state change. Cameras having stability issued may be evicted/excluded from a given EC set, since/when their parity information cannot be accessed.

Figure 9:
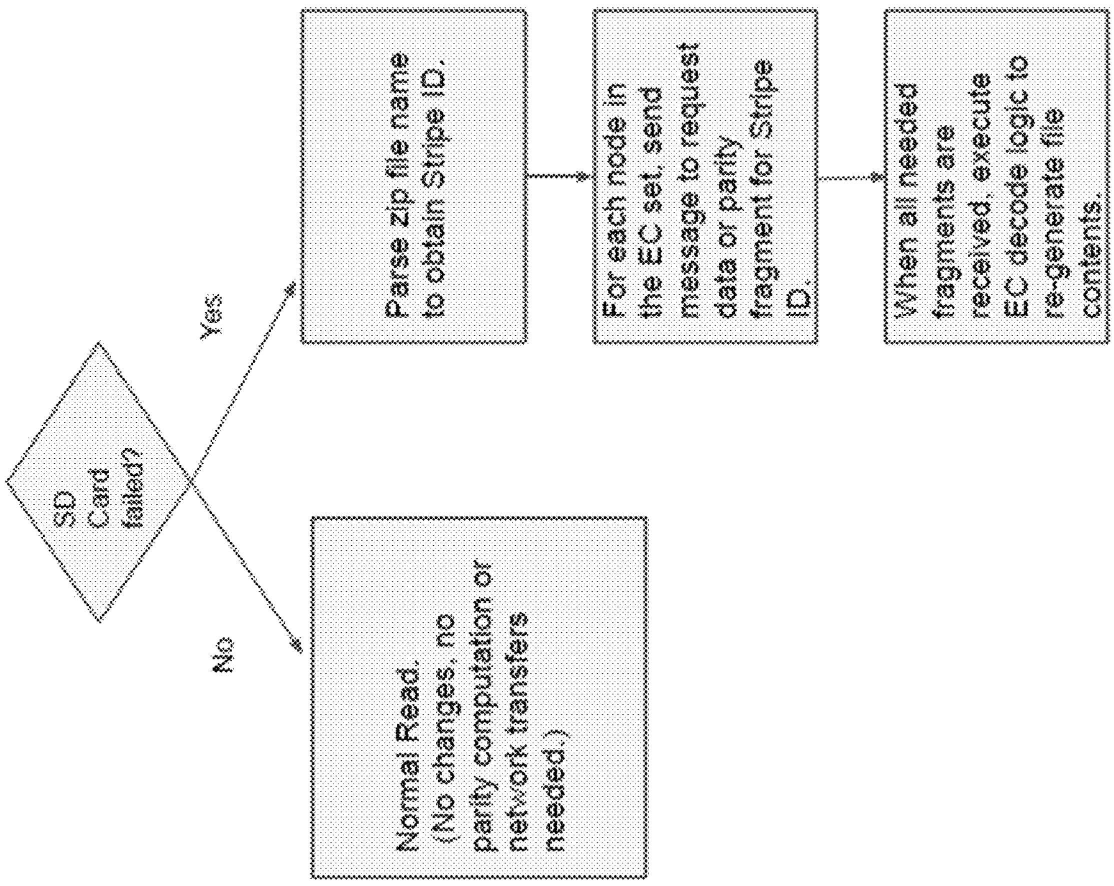
FIG. 9 is a flowchart illustrating a second example of what occurs at a sensor when requesting video data from an SD card, including the handling of an SD card failure, according to an embodiment.

FIG. 9 is a flowchart illustrating a second example of what occurs at a sensor when requesting video data from an SD card, including the handling of an SD card failure, according to an embodiment. If an SD card has failed, zip files that each contain data from various stripes can be parsed to identify a zip file that includes the stripe identifier(s) associated with requested video data (e.g., via a processor of the sensor). Thereafter, a request for video data or parity data for the stripe identifier(s) is sent to other sensors in the fleet (e.g., via the processor of the sensor). After the video data and parity data has been received, the requested video data can be regenerated (e.g., via the processor of the sensor). If the SD does not fail, the video data can be read from the SD card (e.g., via a processor of the sensor).

Figure 10:
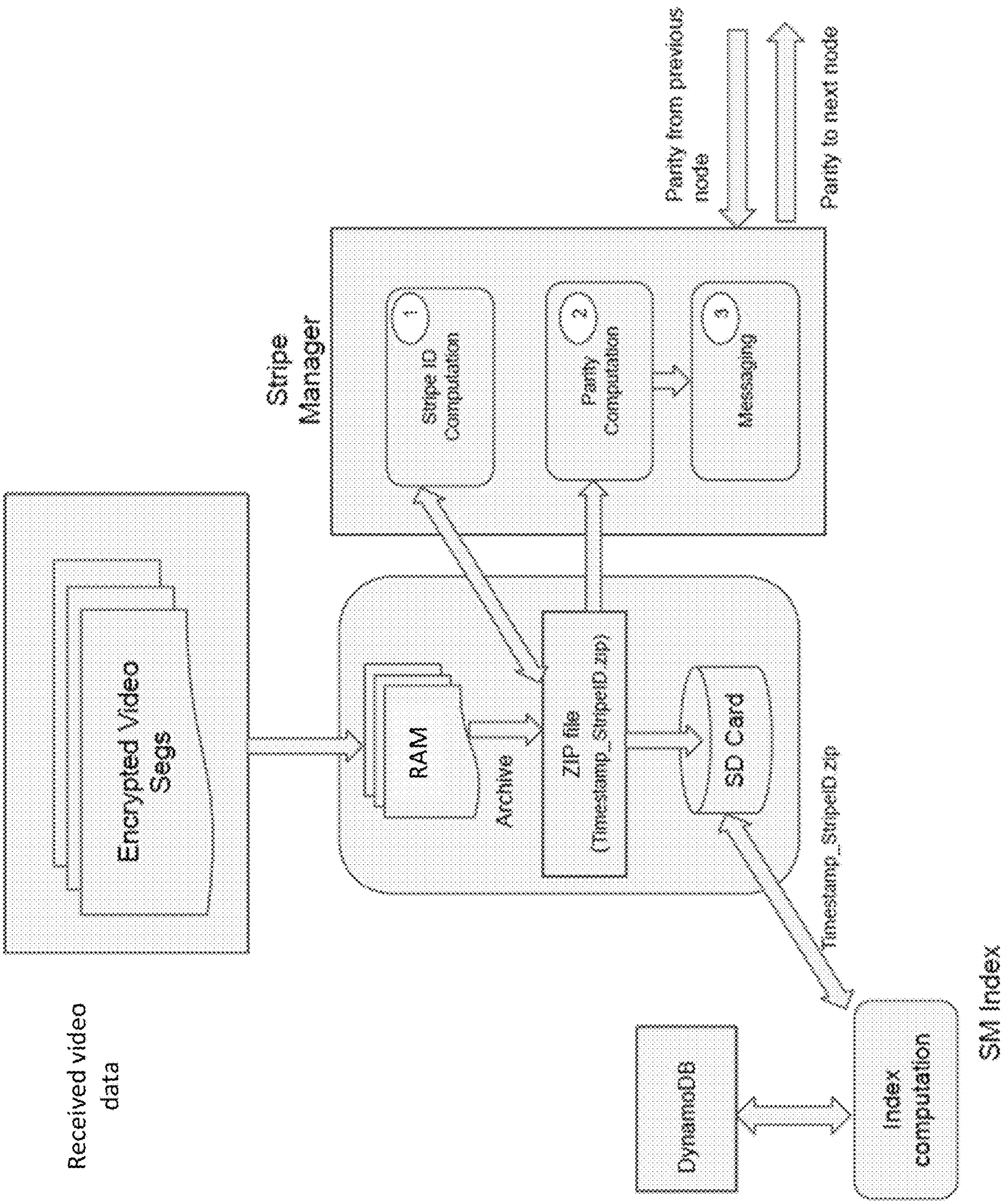
FIG. 10 illustrates an example system for implementing a stripe write algorithm, according to an embodiment.

FIG. 10 illustrates an example system for implementing a stripe write algorithm, according to an embodiment. In some embodiments, each node in a fleet of nodes/EC set is configured with an immutable/fixed node identifier ("Node_ID": Node_ID$\in$([0, (N−1)]). When processing file writes, a stripe write sub-procedure may be invoked. As shown in FIG. 10, a stripe manager (SM) writer (implemented in software and/or hardware) can receive encrypted video segments (e.g., in Random-Access Memory (RAM)) and compile the encrypted video segments in one or more zip files. The one or more zip files may be named such that the filename includes a timestamp and a stripe identifier (stripe ID). The one or more zip files may then be stored/archived in a SD card, from which the zip files may subsequently be retrieved. A stripe manager indexing function can include computing indices (using an index computation) for retrieved zip files and optionally storing them in an indexed manner, e.g., in a remote database that is communicably coupled to the SM writer. A stripe manager (implemented in software and/or hardware) operably coupled to the SM writer can compute stripe identifiers for the zip files, perform parity computations for the zipfiles, and/or generate messages based on the zip files. The stripe manager can receive signals representing parity information from a previous node in a node sequence, and can cause transmission of signals representing parity information to a next node in the node sequence. The SM writer and/or stripe manager shown in FIG. 10 may be included within a common single node/camera/sensor from a fleet of nodes/cameras/sensors, and each node/camera/sensor from the fleet of nodes/cameras/sensors can include its own associated SM writer and stripe manager. In some implementations, the stripe manager is stored in a sensor (e.g., sensor 102, 122 or 142). The stripe manager can be configured to exchange parity read and write messages and/or sensor data with other sensors ("peer nodes") in a fleet of sensors and/or with one or more remote compute devices. Alternatively or in addition, the stripe manager can be configured to execute strip data calculations using one or more EC algorithms. The stripe manager can also be configured to recover or re-create lost sensor data (e.g., due to a failed SD card) using sensor data and/or parity data received (e.g., in response to a request or requests) from other sensors in the fleet. The stripe manager can also be configured to provide a subset of parity data based on video captured by the sensor. The stripe manager can also be configured to initiate and participate in cluster messaging (e.g., using a cluster consistency protocol like Raft or Paxos). The stripe manager can also be configured to communicate with a database compute device (e.g., database compute device 180) regarding the fleet (e.g., diagnostic information, performance statistics, etc.). In some implementations, each stripe manager has one associated SD card, and for cameras with multiple SD cards, multiple instances of the stripe manager may be used. Alternatively or in addition, in some implementations, a mechanism similar to a queued report replay (QRR) can be used to log pending stripe transactions for later replay, e.g., if one or more peer nodes are temporarily unavailable.

In some implementations, a stripe manager performs the following steps: increment a stripe ID counter globally (e.g., using Paxos or Raft), compute a parity term for the current node based on zip file data and an EC coding generator matrix, and cause the resulting parity term to be communicated/sent to one or more peer nodes, or if the current node is the parity node for the current stripe (e.g., the last node in a message order), write the resulting parity term to the local filesystem and not send the resulting parity term to the one or more peer nodes. In some instances, the zip file filename is encoded with the stripe ID so that, in the event of a storage failure, the zip file can be regenerated using stripe information of peer nodes. Alternatively or in addition, the writing of the zip file to the SD card is performed prior to the completion of the parity computation. In other words, the writing of the zip file to the SD card may not be made to wait for the parity computation to complete. In some implementations, a generator matrix/EC coding generator matrix is a square matrix used for multiplying each file of video data with its corresponding column from the matrix, such that extra rows of parity information are generated. The foregoing may be referred to as the process of encoding. When decoding, the multiplicative inverse of the matrix can be used to re-generate missing data from the parity information. Multiplication and addition can be performed, by way of example, using Galois arithmetic.

Figure 11:
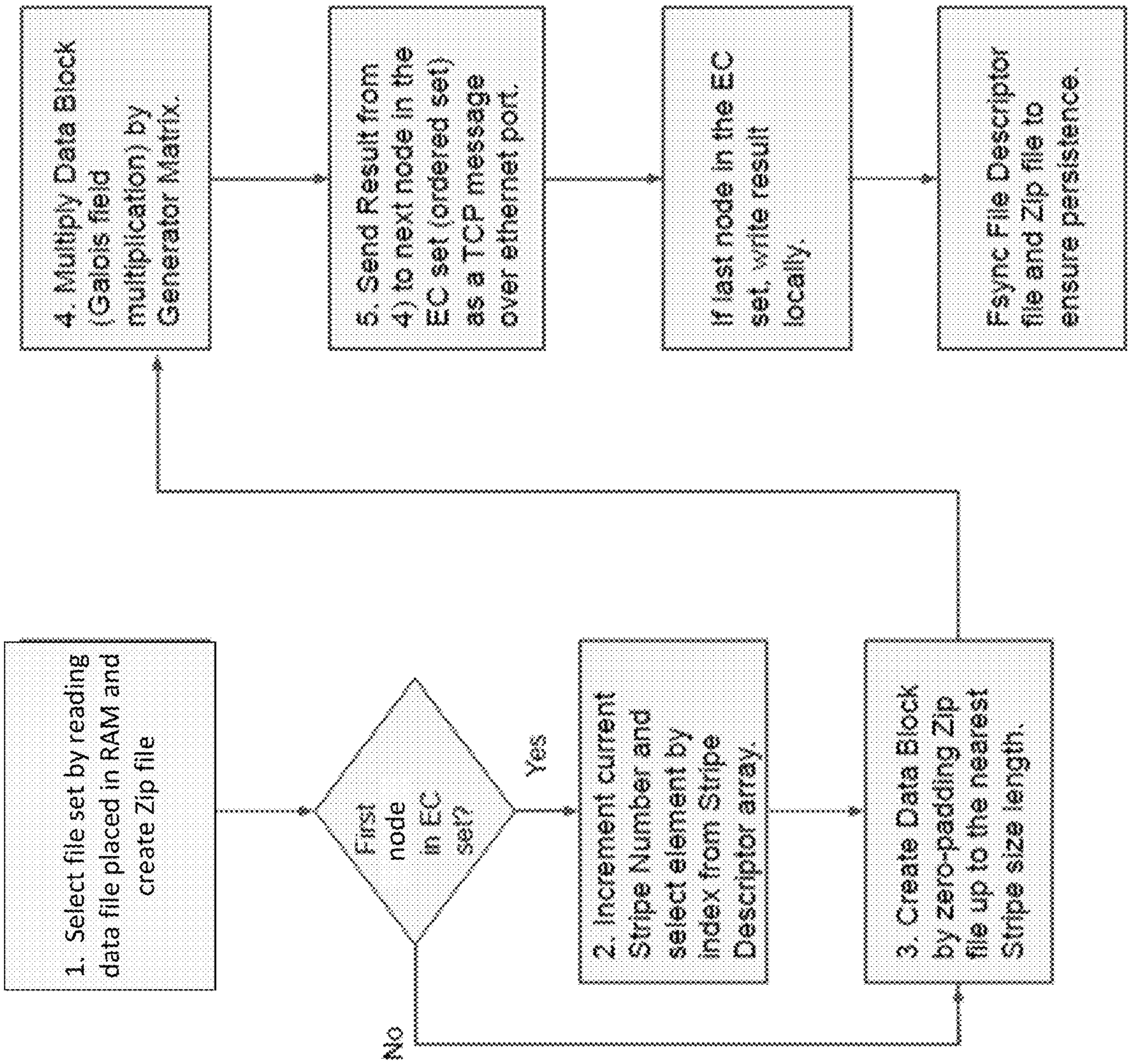
FIG. 11 is a flowchart illustrating a command flow for system writes, according to an embodiment.

FIG. 11 is a flowchart illustrating an example command flow for system writes, according to an embodiment. As shown in FIG. 11, the command flow begins at step 1, with selecting a file set by reading a data file placed in RAM and creating a zip file based on at least a portion of the file set. If the node that is creating the zip file is the first node in an EC set, a current stripe number is incremented at step 2, and a node is selected based on its index from a stripe descriptor array. After step 2, or if the node that is creating the zip file is not the first node in an EC set, a data block is created at step 3 by zero-padding the zip file up to the nearest stripe size length. At step 4, the data block is multiplied (e.g., using Galois field multiplication) by the generator matrix. The result of the multiplication at step 4 is then set, at step 5, to a next node in the EC set (i.e., an ordered set), for example as a transmission control protocol (TCP) message over an ethernet port. Optionally, if the current node is the last node in the EC set, step 5 may be omitted and the result of the multiplication at step 4 may be written to local memory/storage. An Fsync function or similar may optionally be used to force a physical write of file descriptor file and the zip file to memory, to ensure persistence.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. A non-transitory, processor-readable medium storing instructions that, when executed by a processor, cause the processor to:
- receive, from a first camera from a plurality of cameras and at a second camera from the plurality of cameras, a first parity data generated by the first camera based on first video data captured by the first camera, the first video data stored (1) as part of a first data stripe from a plurality of data stripes that is associated with the plurality of cameras and (2) in a first data storage medium operatively coupled to the first camera;
- modify, at the second camera, the first parity data to generate a second parity data based on the first parity data and second video data captured by the second camera, the second video data stored (1) as part of the first data stripe and (2) in a second data storage medium operatively coupled to the second camera;
- send, from the second camera and to a third camera from the plurality of cameras, the second parity data to cause the third camera to generate a third parity data based on the second parity data and third video data captured by the third camera, the third parity data stored (1) as part of the first data stripe and (2) in a third data storage medium operatively coupled to the third camera, the third video data stored as part of a second data stripe from the plurality of data stripes and in the third data storage medium;
- receive an indication that the second video data has become inaccessible; and
- receive the second video data in response to a request, based on the first data stripe, and not based on the second data stripe.

2. The non-transitory, processor-readable medium of claim 1, wherein the first data stripe further includes a fourth parity data stored in a fourth data storage medium operatively coupled to a fourth camera from the plurality of cameras.

3. The non-transitory, processor-readable medium of claim 1, wherein the first camera is configured to operate at a first video data capture rate and the second camera is configured to operate at a second video data capture rate different from the first video data capture rate.

4. The non-transitory, processor-readable medium of claim 1, wherein the first parity data includes parity data generated by multiplying the first video data with an erasure code associated with the first camera.

5. The non-transitory, processor-readable medium of claim 1, wherein the non-transitory, processor-readable medium further stores instructions to cause the processor to:
- receive, at the second camera and from the first camera, a fourth parity data generated by the first camera based on (1) fourth video data captured by the first camera and (2) a fifth parity data generated by the third camera, the fourth video data stored as part of the second data stripe and in the first data storage medium; and
- modify, at the second camera, the fourth parity data to generate a sixth parity data based on the fourth parity data and fifth video data (1) captured by the second camera and (2) stored as part of a third data stripe from the plurality of data stripes, the sixth parity data stored as part of the second data stripe and in the second data storage medium.

6. The non-transitory, processor-readable medium of claim 5, wherein the fourth parity data includes parity data generated by multiplying the fourth video data with an erasure code associated with the first camera.

7. The non-transitory, processor-readable medium of claim 1, wherein the non-transitory, processor-readable medium further stores instructions to cause the processor to:
- receive, at the second camera and from the first camera, a fourth parity data generated by the first camera based on (1) fourth video data captured by the first camera and (2) a fifth parity data generated by the third camera, the fourth video data stored as part of the second data stripe and in the first data storage medium;
- modify, at the second camera, the fourth parity data to generate a sixth parity data based on the fourth parity data and fifth video data (1) captured by the second camera and (2) stored as part of a third data stripe from the plurality of data stripes, the sixth parity data stored as part of the second data stripe and in the second data storage medium; and
- in response to at least one of the fourth video data or the third video data being inaccessible, transmitting the sixth parity data to at least one of the first camera or the third camera.

8. A non-transitory, processor-readable medium storing instructions that, when executed by a processor, cause the processor to:
- receive, from a first camera from a plurality of cameras and at a second camera from the plurality of cameras, a first parity data generated by the first camera based on first video data captured by the first camera, the first video data stored (1) as part of a first data stripe from a plurality of data stripes that is associated with the plurality of cameras and (2) in a first data storage medium operatively coupled to the first camera, each data stripe from the plurality of data stripes is associated with at least one of: a unique data stripe identifier (ID) from a plurality of data stripe identifiers, or a bitmask indicating at least one camera from the plurality of cameras associated with that data stripe;

modify, at the second camera, the first parity data to generate a second parity data based on the first parity data and second video data captured by the second camera, the second video data stored (1) as part of the first data stripe and (2) in a second data storage medium operatively coupled to the second camera;

send, from the second camera and to a third camera from the plurality of cameras, the second parity data to cause the third camera to generate a third parity data based on the second parity data and third video data captured by the third camera, the third parity data stored (1) as part of the first data stripe and (2) in a third data storage medium operatively coupled to the third camera, the third video data stored as part of a second data stripe from the plurality of data stripes and in the third data storage medium;

receive an indication that the second video data has become inaccessible; and receive the second video data in response to a request, based on the first data stripe, and not based on the second data stripe.

9. A method, comprising:

receiving, from a first camera from a plurality of cameras and at a second camera from the plurality of cameras, a first parity data generated by the first camera based on first video data captured by the first camera, the first video data stored (1) as part of a first data stripe from a plurality of data stripes that is associated with the plurality of cameras and (2) in a first data storage medium operatively coupled to the first camera;

modifying, at the second camera, the first parity data to generate a second parity data based on the first parity data and second video data captured by the second camera, the second video data stored (1) as part of the first data stripe and (2) in a second data storage medium operatively coupled to the second camera and not directly accessible by the first camera; and sending, from the second camera and to a third camera from the plurality of cameras, the second parity data to cause the third camera to generate a third parity data based on the second parity data and third video data captured by the third camera, the third parity data stored (1) as part of the first data stripe and (2) in a third data storage medium operatively coupled to the third camera and not directly accessible by the first camera and the second camera, the third video data stored in the third data storage medium as part of a second data stripe from the plurality of data stripes and not as part of the first data stripe.

10. The method of claim 9, further comprising:

receiving, at the second camera, an indication that the second video data has become inaccessible;

receiving, at the second camera, the third parity data; and receiving, at the second camera, the second video data in response to a request and based on the third parity data.

11. The method of claim 9, wherein the first data stripe further includes a fourth parity data stored in a fourth data storage medium operatively coupled to a fourth camera from the plurality of cameras, the method further comprising:

receiving, at the second camera, an indication that the second video data has become inaccessible;

receiving, at the second camera, at least one of the third parity data or the fourth parity data; and receiving, at the second camera, the second video data in response to a request and based on the at least one of the third parity data or the fourth parity data.

12. The method of claim 9, wherein a size of the first video data is different from a size of the second video data.

13. The method of claim 9, further comprising:

capturing, at the second camera, fourth video data;

storing, at the second camera, the fourth video data as part of the second data stripe;

receiving, at the second camera, an indication that the fourth video data has become inaccessible; and receiving, at the second camera, the fourth video data in response to a request, based on the second data stripe, and not based on the first data stripe.

14. A method, comprising:

receiving, from a first camera from a plurality of cameras and at a second camera from the plurality of cameras, a first parity data generated by the first camera based on first video data captured by the first camera, the first video data stored (1) as part of a first data stripe from a plurality of data stripes that is associated with the plurality of cameras and (2) in a first data storage medium operatively coupled to the first camera, at least one data stripe from the plurality of data stripes being associated with a unique data stripe identifier (ID) from a plurality of data stripe identifiers and a bitmask;

modifying, at the second camera, the first parity data to generate a second parity data based on the first parity data and second video data captured by the second camera, the second video data stored (1) as part of the first data stripe and (2) in a second data storage medium operatively coupled to the second camera and not directly accessible by the first camera; and sending, from the second camera and to a third camera from the plurality of cameras, the second parity data to cause the third camera to generate a third parity data based on the second parity data and third video data captured by the third camera, the third parity data stored (1) as part of the first data stripe and (2) in a third data storage medium operatively coupled to the third camera and not directly accessible by the first camera and the second camera, the third video data stored in the third data storage medium as part of a second data stripe from the plurality of data stripes and not as part of the first data stripe.

15. An apparatus, comprising:

a memory; and a processor operatively coupled to the memory, the processor configured to:

receive, from a first sensor from a plurality of sensors and at a second sensor from the plurality of sensors, a first parity data generated by the first sensor based on first sensor data captured by the first sensor, the first sensor data stored (1) as part of a first data stripe from a plurality of data stripes that is associated with the plurality of sensors and (2) in a first data storage medium operatively coupled to the first sensor;

modify, at the second sensor, the first parity data to generate a second parity data based on the first parity data and second sensor data captured by the second sensor, the second sensor data stored (1) as part of the first data stripe and (2) in a second data storage medium operatively coupled to the second sensor;

send, by the second sensor and to a third sensor from the plurality of sensors, the second parity data to cause the third sensor to generate a third parity data based on the second parity data and third sensor data captured by the third sensor, the third parity data stored (1) as part of the first data stripe and (2) in a third data storage medium operatively coupled to the third sensor, the third sensor data stored in the third data storage medium as part of a second data stripe from the plurality of data stripes and not as part of the first data stripe;

receive an indication that the second sensor data has become inaccessible;

request the third parity data in response to detecting that the second sensor data has become inaccessible; and receive the second sensor data in response to a request and based on the third parity data.

16. The apparatus of claim 15, wherein the processor is further configured to:

store a fourth parity data as part of the second data stripe and in the second data storage medium.

17. The apparatus of claim 15, wherein the first data stripe further includes a fourth parity data stored in a fourth data storage medium operatively coupled to a fourth sensor from the plurality of sensors.

18. The apparatus of claim 15, wherein each data stripe from the plurality of data stripes is associated with a unique data stripe identifier (ID) from a plurality of data stripe identifiers.

19. An apparatus, comprising:

a memory; and a processor operatively coupled to the memory, the processor configured to:

receive, from a first sensor from a plurality of sensors and at a second sensor from the plurality of sensors, a first parity data generated by the first sensor based on first sensor data captured by the first sensor, the first sensor data stored (1) as part of a first data stripe from a plurality of data stripes that is associated with the plurality of sensors and (2) in a first data storage medium operatively coupled to the first sensor, each data stripe from the plurality of data stripes being associated with a bitmask from a plurality of bitmasks indicating at least one sensor from the plurality of sensors associated with that data stripe;

modify, at the second sensor, the first parity data to generate a second parity data based on the first parity data and second sensor data captured by the second sensor, the second sensor data stored (1) as part of the first data stripe and (2) in a second data storage medium operatively coupled to the second sensor;

send, by the second sensor and to a third sensor from the plurality of sensors, the second parity data to cause the third sensor to generate a third parity data based on the second parity data and third sensor data captured by the third sensor, the third parity data stored (1) as part of the first data stripe and (2) in a third data storage medium operatively coupled to the third sensor, the third sensor data stored in the third data storage medium as part of a second data stripe from the plurality of data stripes and not as part of the first data stripe;

receive an indication that the second sensor data has become inaccessible;

request the third parity data in response to detecting that the second sensor data has become inaccessible; and receive the second sensor data in response to a request and based on the third parity data.

20. An apparatus, comprising:

a memory; and a processor operatively coupled to the memory, the processor configured to: receive, from a first sensor from a plurality of sensors and at a second sensor from the plurality of sensors, a first parity data generated by the first sensor based on first sensor data captured by the first sensor, the first sensor data stored (1) as part of a first data stripe from a plurality of data stripes that is associated with the plurality of sensors and (2) in a first data storage medium operatively coupled to the first sensor, at least one data stripe from the plurality of data stripes being associated with at least one of a data length, a filename, or a bitmask;

modify, at the second sensor, the first parity data to generate a second parity data based on the first parity data and second sensor data captured by the second sensor, the second sensor data stored (1) as part of the first data stripe and (2) in a second data storage medium operatively coupled to the second sensor;

send, by the second sensor and to a third sensor from the plurality of sensors, the second parity data to cause the third sensor to generate a third parity data based on the second parity data and third sensor data captured by the third sensor, the third parity data stored (1) as part of the first data stripe and (2) in a third data storage medium operatively coupled to the third sensor, the third sensor data stored in the third data storage medium as part of a second data stripe from the plurality of data stripes and not as part of the first data stripe;

receive an indication that the second sensor data has become inaccessible;

request the third parity data in response to detecting that the second sensor data has become inaccessible; and receive the second sensor data in response to a request and based on the third parity data.

* * * * *